US008534908B2

(12) United States Patent
Rhodes, II et al.

(10) Patent No.: US 8,534,908 B2
(45) Date of Patent: Sep. 17, 2013

(54) PITCHER HAVING MIXING DEVICE

(75) Inventors: Idus L. Rhodes, II, Maplewood, MO (US); Charles H. Miller, Imperial, MO (US)

(73) Assignee: Handi-Craft Company, St. Louis, MO (US)

( * ) Notice: Subject to any disclaimer, the term of this patent is extended or adjusted under 35 U.S.C. 154(b) by 1413 days.

(21) Appl. No.: 11/852,066

(22) Filed: Sep. 7, 2007

(65) Prior Publication Data

US 2008/0259723 A1  Oct. 23, 2008

Related U.S. Application Data

(60) Provisional application No. 60/913,073, filed on Apr. 20, 2007.

(51) Int. Cl.
*A47J 43/044* (2006.01)

(52) U.S. Cl.
USPC ........................................ 366/243; 222/465.1

(58) Field of Classification Search
USPC .............. 222/465.1; 366/185, 243, 247, 255, 366/277
See application file for complete search history.

(56) References Cited

U.S. PATENT DOCUMENTS

| 66,306 | A | * | 7/1867 | Davison | 366/247 |
|---|---|---|---|---|---|
| 77,431 | A | * | 4/1868 | Elliott | 366/243 |
| 400,547 | A | * | 4/1889 | Crafton | 366/243 |
| 426,525 | A | * | 4/1890 | Cole et al. | 366/243 |
| 467,627 | A | * | 1/1892 | Brachmann | 411/159 |
| 505,692 | A | * | 9/1893 | Adancourt | 366/243 |
| 597,077 | A | * | 1/1898 | Ackermann | 222/229 |
| 681,386 | A | * | 8/1901 | Beynon | 366/243 |
| 817,310 | A | * | 4/1906 | Forbes | 366/164.3 |
| 1,068,450 | A | * | 7/1913 | Roberts | 403/247 |
| 1,133,413 | A | * | 3/1915 | Stough | 366/276 |
| 1,165,307 | A | * | 12/1915 | Baltzley | 366/243 |
| 1,237,585 | A | * | 8/1917 | Tripke | 366/243 |
| 1,238,461 | A | * | 8/1917 | Tripke | 366/243 |
| 1,282,148 | A | * | 10/1918 | Tripke | 366/243 |
| 1,373,761 | A | * | 4/1921 | Rabin et al. | 366/243 |
| 1,413,874 | A | * | 4/1922 | Roberts | 416/65 |
| 1,415,334 | A | * | 5/1922 | Gibson | 416/65 |
| 1,798,757 | A | * | 3/1931 | Roberts | 366/242 |
| 1,918,117 | A | * | 7/1933 | Martin | 222/571 |
| 1,948,431 | A | * | 2/1934 | Rolph | 366/243 |
| 1,987,700 | A | * | 1/1935 | Muir | 416/75 |
| 2,059,910 | A | * | 11/1936 | Ravenscroft | 215/41 |
| 2,158,912 | A | * | 5/1939 | Piperi | 416/75 |
| 2,162,348 | A | * | 6/1939 | Hacmac | 366/243 |
| 2,181,833 | A | * | 11/1939 | Palmieri | 416/75 |
| 2,266,186 | A | * | 12/1941 | Fischer | 366/183.1 |
| 2,559,196 | A | * | 7/1951 | Medved | 99/422 |
| 2,587,344 | A | * | 2/1952 | Livingstone | 222/568 |

(Continued)

OTHER PUBLICATIONS

International Search Report for PCT/US2008/060087, dated Aug. 11, 2008, 8 pages.

*Primary Examiner* — David Sorkin

(74) *Attorney, Agent, or Firm* — Armstrong Teasdale LLP

(57) ABSTRACT

A pitcher has a container for containing liquid and a mixing device disposed at least in part within the container. The mixing device has a shaft adapted for translation relative to the container. An agitating member is connected to the shaft for conjoint translation therewith relative to the container to agitate the liquid in the container. A stop is disposed on the shaft to limit translational movement of the shaft and the agitating member.

25 Claims, 54 Drawing Sheets

(56) References Cited

U.S. PATENT DOCUMENTS

| | | | | |
|---|---|---|---|---|
| 2,726,071 A * | 12/1955 | Bernhardt | | 366/256 |
| 2,740,617 A * | 4/1956 | Ball et al. | | 416/75 |
| 2,749,098 A * | 6/1956 | Johnson | | 366/243 |
| 2,788,830 A * | 4/1957 | Rosan | | 411/259 |
| 2,922,628 A * | 1/1960 | Koe | | 366/129 |
| 3,009,686 A * | 11/1961 | Kaplan | | 366/276 |
| 3,114,484 A * | 12/1963 | Serio | | 222/475.1 |
| 3,115,664 A * | 12/1963 | Del Ponte | | 401/4 |
| 3,154,123 A * | 10/1964 | Tomlinson | | 241/101.6 |
| 3,417,971 A * | 12/1968 | Blank et al. | | 366/196 |
| 3,619,081 A * | 11/1971 | Gruska et al. | | 416/70 R |
| 3,738,535 A * | 6/1973 | Nicholls | | 222/137 |
| 3,744,767 A * | 7/1973 | Blasnik | | 366/243 |
| 4,359,283 A | 11/1982 | McClellan | | |
| 4,946,286 A * | 8/1990 | Purkapile | | 366/247 |
| 5,199,788 A * | 4/1993 | Stallings | | 366/247 |
| 5,284,389 A * | 2/1994 | Lumsden | | 366/256 |
| D384,237 S | 9/1997 | Hess | | |
| 5,695,282 A | 12/1997 | Hess | | |
| D426,742 S | 6/2000 | Gartz et al. | | |
| 6,095,676 A | 8/2000 | Kuan | | |
| 6,200,015 B1 | 3/2001 | Gartz et al. | | |
| 6,227,419 B1 | 5/2001 | Raboin | | |
| 6,231,226 B1 | 5/2001 | Neidigh | | |
| D453,089 S | 1/2002 | Neidigh | | |
| 6,367,962 B1 * | 4/2002 | Mizutani et al. | | 366/189 |
| 6,431,743 B1 * | 8/2002 | Mizutani et al. | | 366/189 |
| 6,895,672 B2 * | 5/2005 | Conforti | | 30/169 |
| 2007/0291585 A1 * | 12/2007 | Sivers | | 366/253 |
| 2009/0238030 A1 * | 9/2009 | Hensler | | 366/129 |

\* cited by examiner

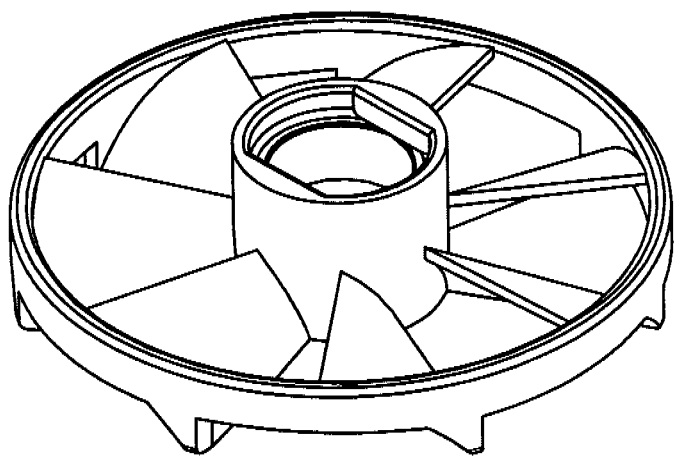
FIG. 55
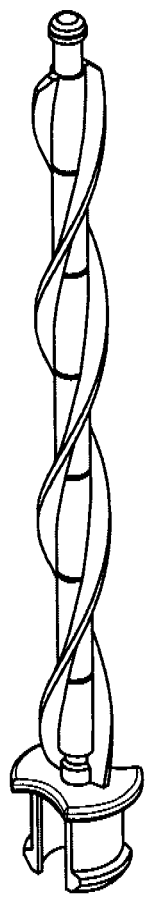
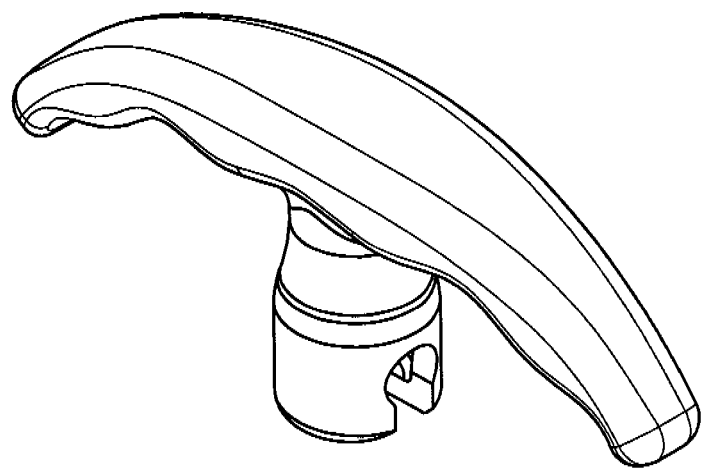
FIG. 56  FIG. 57

PITCHER HAVING MIXING DEVICE

CROSS REFERENCE TO RELATED APPLICATION

This application claims the benefit of U.S. provisional application No. 60/913,073 filed Apr. 20, 2007, which is herein incorporated by reference in its entirety.

FIELD

The present invention generally relates to pitchers for holding liquids and more particularly to a pitcher having a mixing device for mixing liquid solutions within the pitcher.

BACKGROUND

The mixing of liquid solutions finds numerous applications such as liquid-liquid mixing and liquid-solid (e.g., powder) mixing. For example, in preparing baby formula, a predetermined amount of either a liquid concentrate or a powder is mixed with a predetermined amount of water. Often the water and concentrate or powder are poured into a bottle. The bottle is then rigorously shaken to mix the water and concentrate or powder to make the baby formula. The mixing process induces large amounts of air in the formula that, if digested by the baby, can cause colic or other discomforts to the baby. Since the formula is mixed directly into the bottle used for feeding, a new bottle needs to be prepared for each feeding. Thus, the steps of measuring out predetermined amounts of water and concentrate or powder are repeated numerous times a day.

Larger quantities of formula (e.g., more than one feeding worth) can be pre-made and stored in an air tight container. However, some formulas can partially separate while being stored. As a result, the formula has to be remixed before it can be used. Often, the mixing is done using a spoon which has to be obtained separately from the pitcher.

There is need, therefore, for a pitcher having a mixing device therein that is capable of liquid-liquid mixing and liquid-solid mixing without inducing large amounts of air into the mixture.

SUMMARY OF THE INVENTION

In one aspect, a pitcher for mixing a liquid solution generally comprises a container for containing liquid and a mixing device disposed at least in part within the container. The mixing device comprises a shaft adapted for translation relative to the container, an agitating member connected to the shaft for conjoint translation therewith relative to the container to agitate the liquid in the container, and a stop disposed on the shaft to limit translational movement of the shaft and the agitating member.

In another aspect, a pitcher for mixing a liquid solution generally comprises a container for containing liquid and a mixing device disposed at least in part within the container. The mixing device comprises a shaft adapted for translation relative to the container, and an agitating member connected to the shaft for conjoint translation therewith relative to the container to agitate the liquid in the container. The agitating member is further adapted for rotation within the container in response to translating movement of the shaft.

In yet another aspect, a pitcher for mixing a liquid solution generally comprises a container for containing liquid and a mixing device disposed at least in part within the container. The mixing device comprises a shaft adapted for translation relative to the container, and an agitating member connected to the shaft for conjoint translation therewith relative to the container to agitate the liquid in the container. The agitating member includes a plurality of spaced apart blades with each of the blades being curved and angled with respect to the shaft.

BRIEF DESCRIPTION OF THE DRAWINGS

FIG. 55 is a perspective view of a mixing device of the pitcher;

FIG. 56 is a perspective view of a shaft of the mixing device; and

FIG. 57 is a perspective view of a stop of the mixing device.

Corresponding reference characters indicate corresponding parts throughout the drawings.

DESCRIPTION OF THE DRAWINGS

Figure 1:
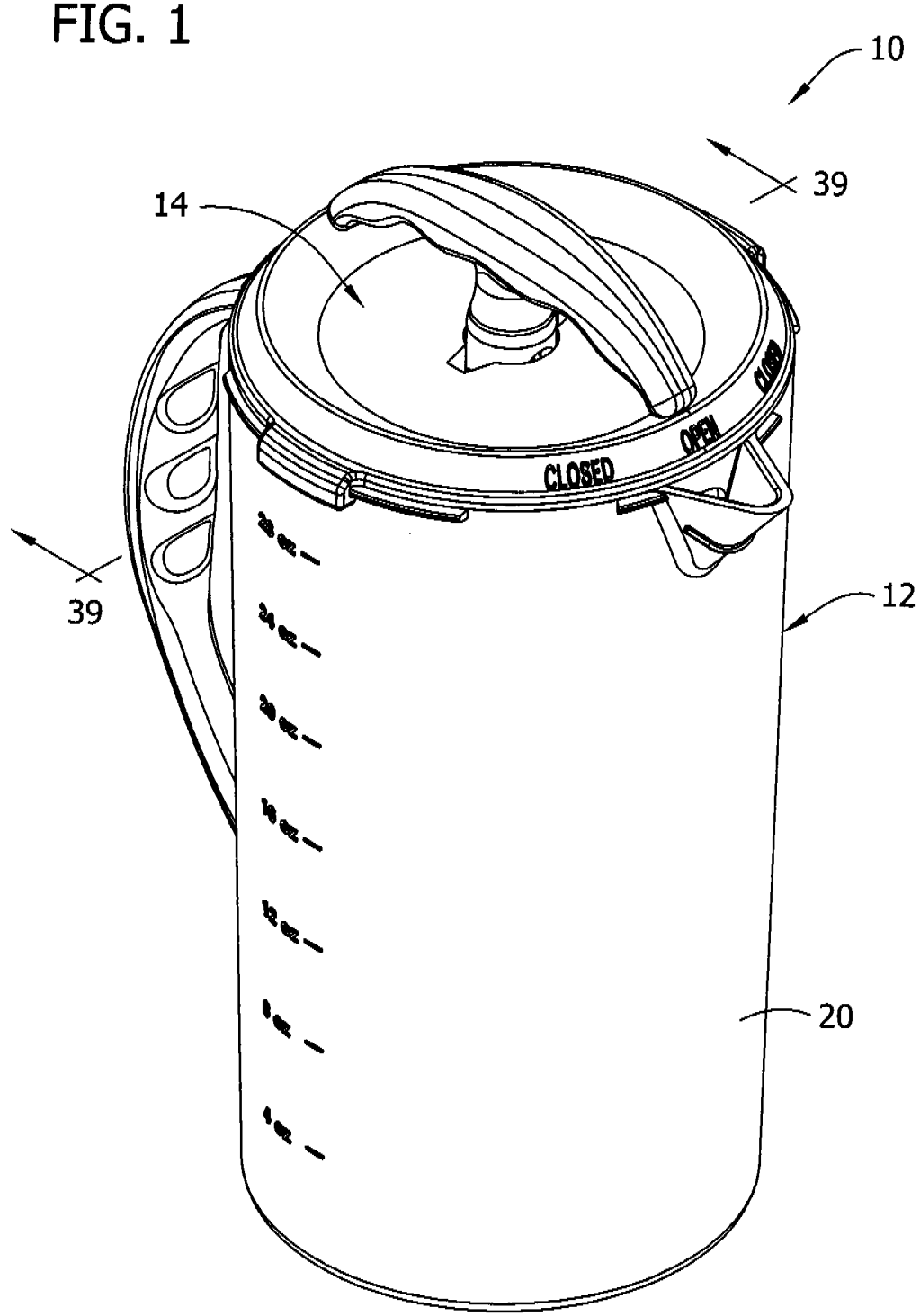
FIG. 1 is a perspective view of a pitcher including a container, a lid for closing the container, and a mixing device received in the container, the lid being in a locked position.
Figure 2:
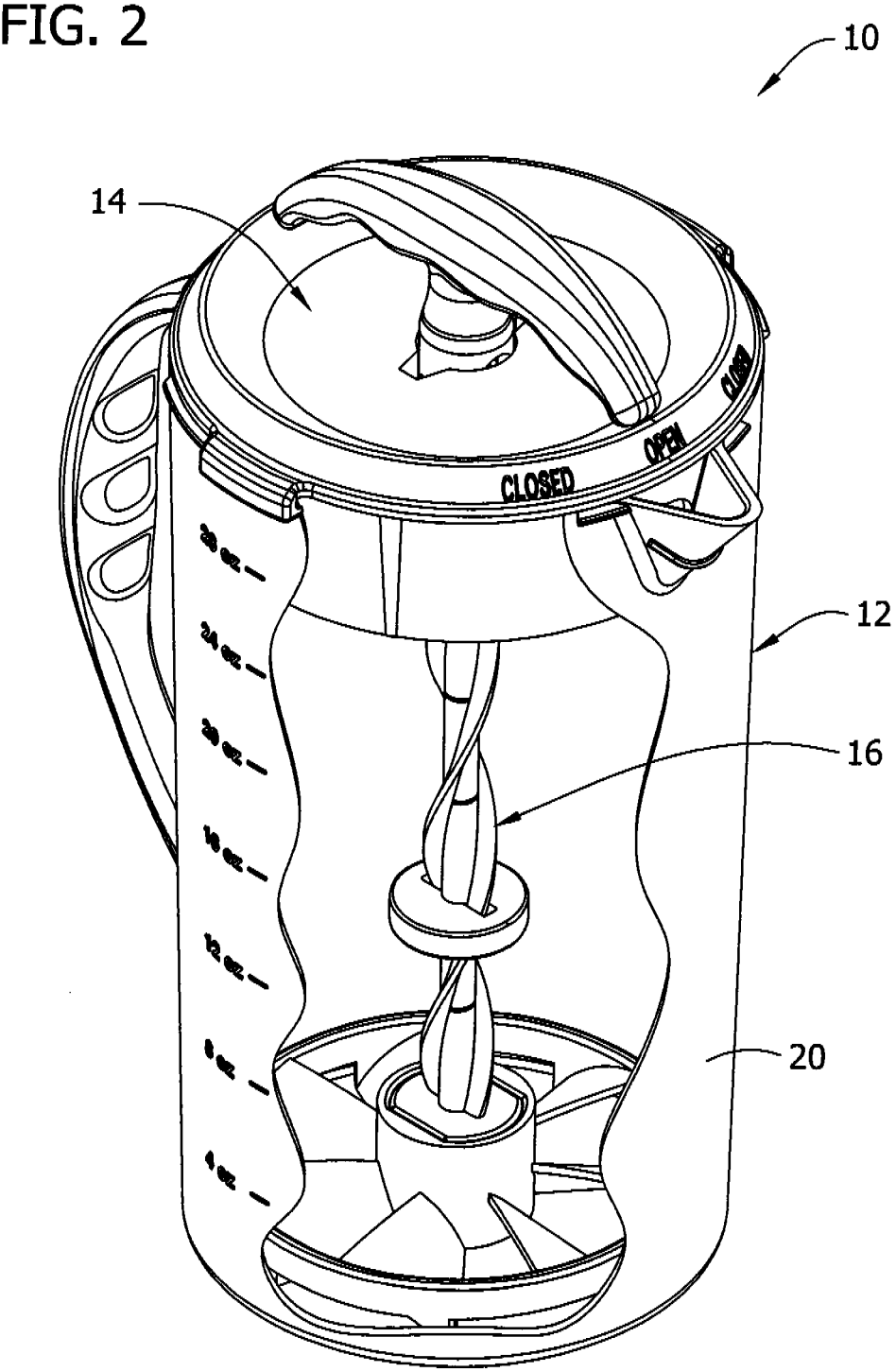
FIG. 2 is a perspective view of the pitcher with a portion of the container broken away to show additional detail of the mixing device.
Figure 3:
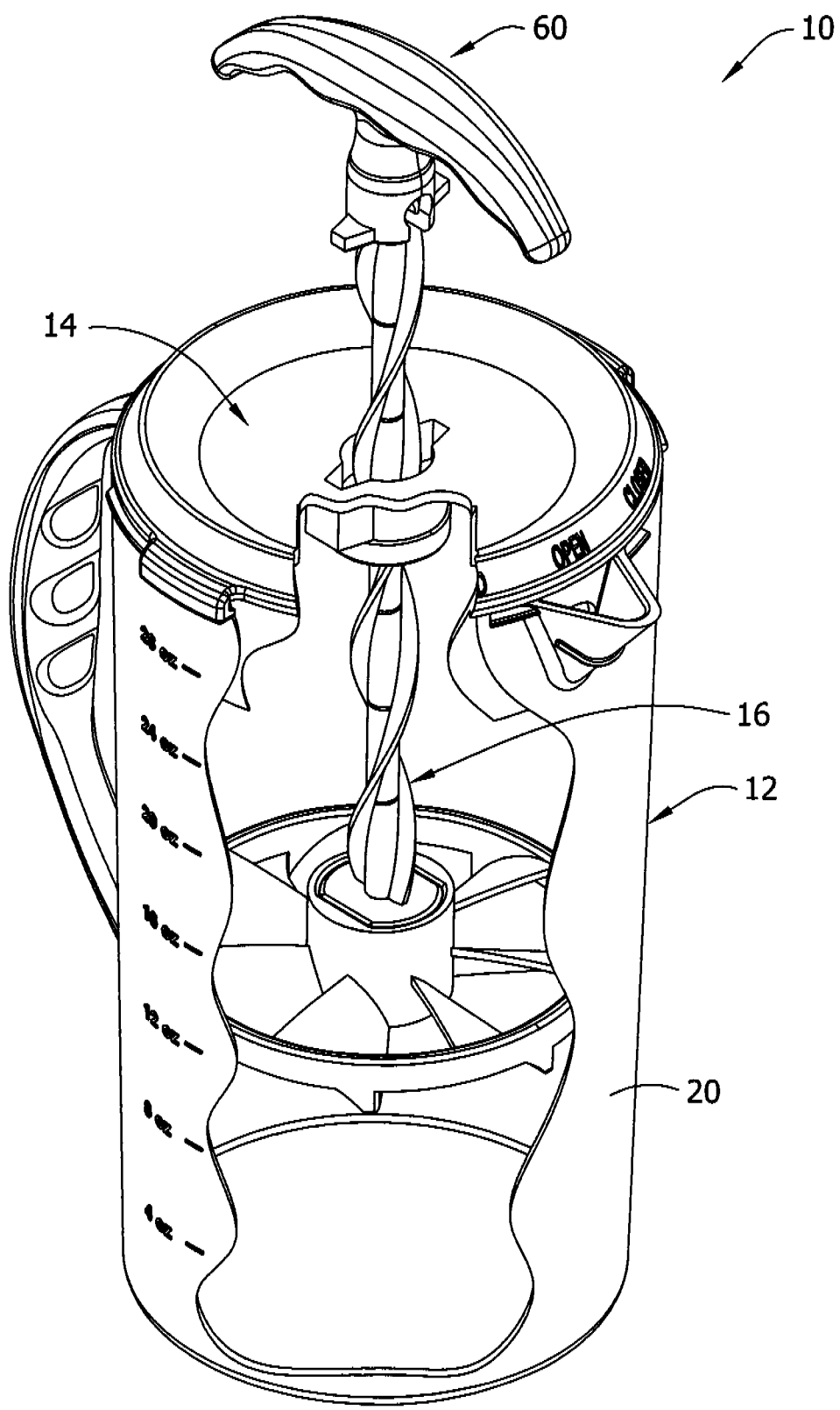
FIG. 3 is a perspective view similar to FIG. 2 but with the mixing device in a raised position.

With reference now to FIGS. 1-5, one embodiment of a pitcher in which a liquid solution may be mixed therein is generally indicated at 10. The pitcher 10 generally comprises a container 12 for containing liquid, a lid 14 providing a closure for the container, and a mixing device 16 for mixing a liquid solution within the container. The container 12, lid 14, and mixing device 16 are indicated generally by their respective reference numbers in the accompanying figures. The mixing device 16 according to one particularly suitable embodiment is configured to mix liquid solution in the container 12 while minimizing the amount of air introduced into the solution during mixing. In one embodiment, the pitcher 10 is suitable for mixing baby formula (e.g., mixing formula powder into water). However, it is understood that the pitcher may be used for other liquid-liquid or liquid-solid solutions without departing from the scope of this invention.

The container 12 of the illustrated configuration has a generally cylindrical sidewall 20 (i.e., generally annular in cross-section) with a closed, flat bottom 22 and an open top 24 (FIGS. 6-11). The sidewall 20 and bottom 22 of the container 12 cooperatively define an interior volume 26 adapted to receive and hold liquid as well as other materials, such as particulate matter, powder, or the like mixed with the liquid to form a liquid solution. The interior volume 26 of the illustrated container 12 is approximately thirty-two (32) ounces but it is understood that the container can be formed with a greater or smaller interior volume.

Hash marks 28a and indicia 28b are provided on an outer surface of the sidewall 20 for allowing easy measurement of liquid placed in the container 12. In the illustrated configuration, the hash marks 28a and indicia 28b are spaced appropriately so that approximately four (4) ounces of liquid can be held by the container 12 between adjacent hash marks. For example, from the bottom 22 of the container 12 to the first hash mark is four (4) ounces, from the bottom to the second hash mark is eight (8) ounces and so on. It is understood that the sidewall 20 can be free of hash marks and/or indicia and that the distance between hash marks and/or indicia can be different or correspond to other known units of measuring liquids besides ounces (e.g., milliliters, liters, cups).

Figure 50:
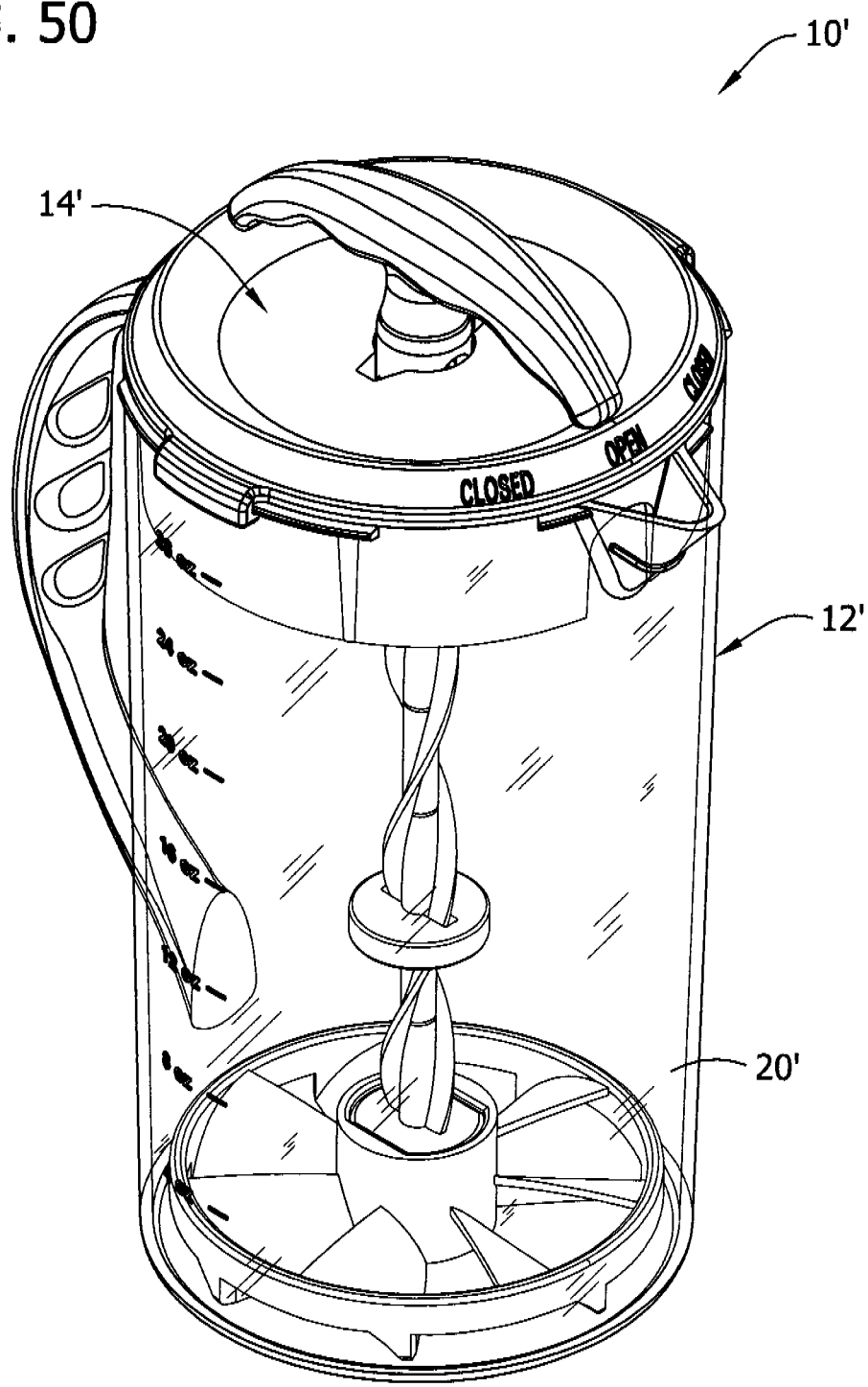
FIG. 50 is a perspective view of a pitcher of a second embodiment wherein the container of the pitcher is transparent.

It is also understood that more than one set of hash marks and/or indicia can be placed on the outer surface of the sidewall 20 to represent more than one unit of measurement. For example, hash marks and/or indicia can be provided for ounces, milliliters, liters, and cups. The illustrated container 12 is translucent but it is contemplated that the container may be transparent (as shown in the alternative embodiment of FIG. 50) or opaque.

The container 12 includes a handle 30 attached to the sidewall 20 and a spout 32 for pouring liquid solution from the container. The handle 30 allows a user to easily pick up and tilt the container 12 thereby allowing solution to flow out of the pitcher 10 at the spout 32. In the illustrated configuration, the handle 30 is formed separate from the sidewall 20 and secured thereto (e.g., such as by adhesive or other securement techniques) but it is understood that the handle and the sidewall can be formed as one piece. The spout 32 of the illustrated configuration is relatively small to assist in pouring liquid solution into receptacles with relatively small openings (e.g., the mouth of a baby bottle) and includes a purchase rib 32a to prevent the spout 32 from slipping out of the receptacle being filled. But it is understood that the spout 32 can have different sizes and configurations.

In the illustrated configuration, the handle 30 is located on the side of the container 12 opposite the spout 32. While this configuration is preferred, it is contemplated that the handle 30 and spout 32 can have different locations relative to each other within the scope of this invention. The container 12 also has two circumferentially extending rails 34a, 34b. These rails 34a, 34b are located on opposite sides of the sidewall 20 to extend generally between the handle 30 and the spout 32 adjacent to the open top 24.

With reference to FIGS. 12-17, the lid 14 has a pair of tabs 56 extending radially therefrom and being generally C-shaped in cross-section to define a channel 58 sized for receiving the rails 34a, 34b therein to lock the lid on the container 12. The lid 14 includes a generally circular top portion 40 and a depending sidewall 52 from which the tabs 56 extend. A recess 42 is formed centrally in the top of the lid and includes a generally circular portion 42a and two, opposed frustum portions 42b. An opening 43 is formed in the top of the lid, at the bottom of the recess 42, with a central opening 43a and a pair of key slots 43b extending radially outward from opposite sides of the central opening 43a. Adjacent the circumferential edge of the top 40, the lid 14 is formed to have an upward ramp 44, a narrow plateau 46, and a downward ramp 48, respectively. An annular ring 50 extends about the edge of the downward ramp 48. The sidewall 52 depends from the downward ramp 48. A generally U-shaped cutout 54 is formed in the sidewall 52 for alignment with the spout 32 to allow liquid to pass through the lid 14 to the spout. Indicia 59 is located on the downward ramp 48 to identify the location of the cutout 54. In the illustrated configuration, the word "open" is located above the cutout 54 while the word "closed" is disposed on both sides of the word "open" and spaced from the cutout. It is understood that the lid 14 can have a configuration different than illustrated herein.

As shown in FIGS. 18-21, the mixing device 16 generally comprises a grip 60, a shaft 80, a stop 120 located on the shaft, and an agitating member 100 operatively connected to the shaft. The grip 60, which is shown in detail in FIGS. 22-25, is generally T-shaped having a gripping portion 62 and a connecting portion 64.

Figure 25:
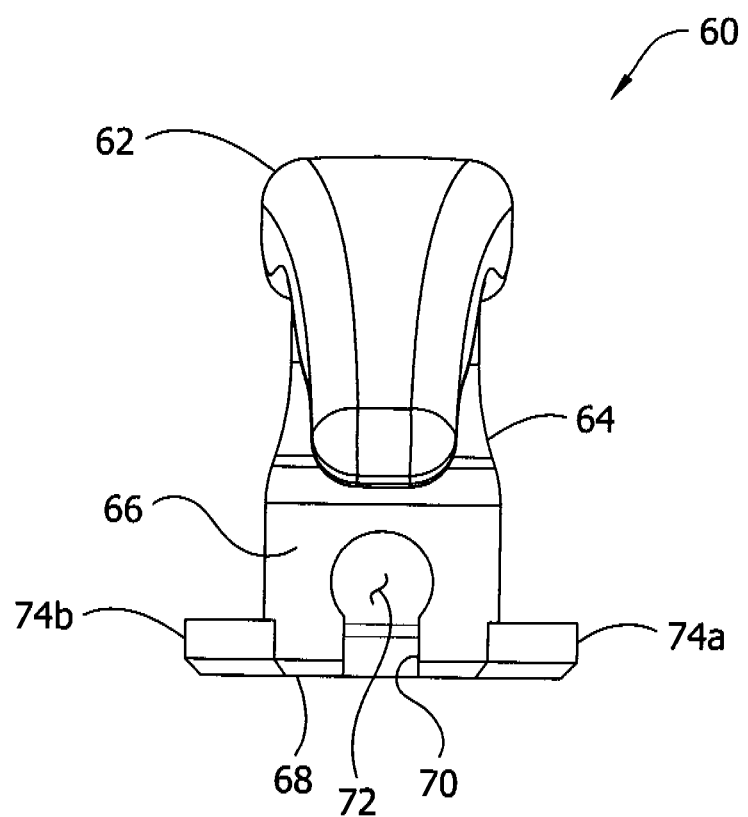
FIG. 25 is a front elevation thereof.
Figure 26:
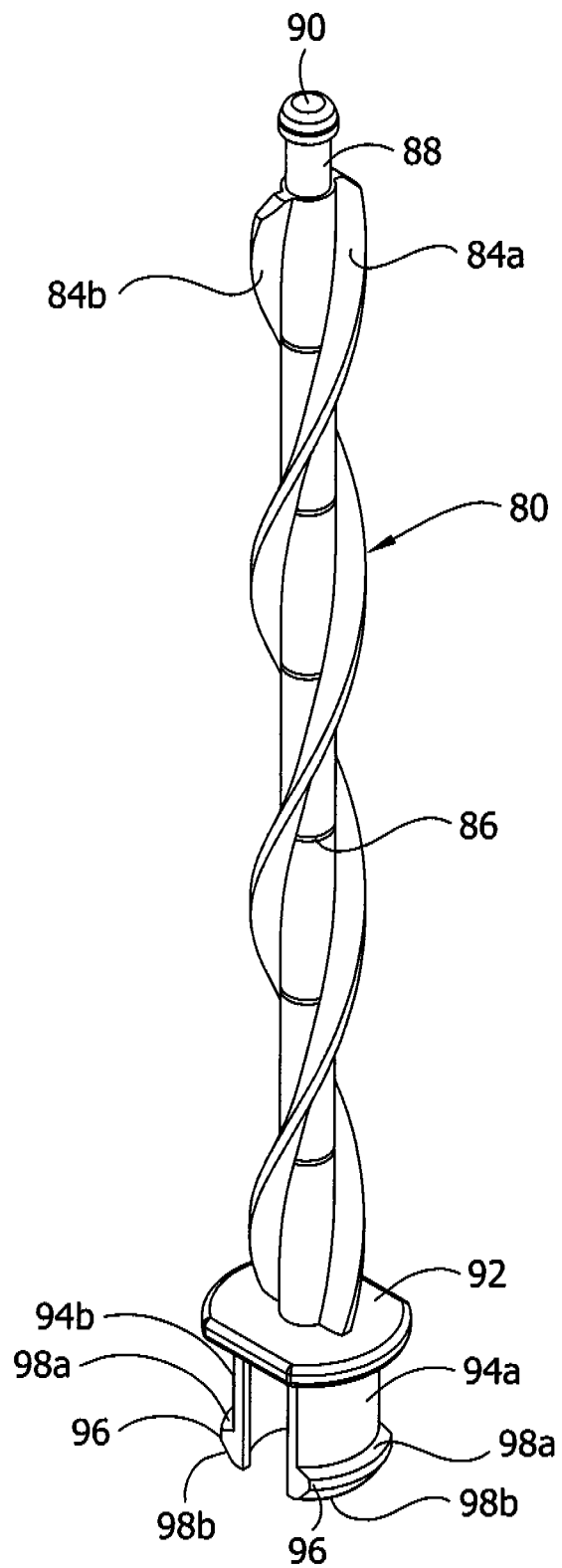
FIG. 26 is a perspective view of a shaft of the mixing device.
Figure 27:
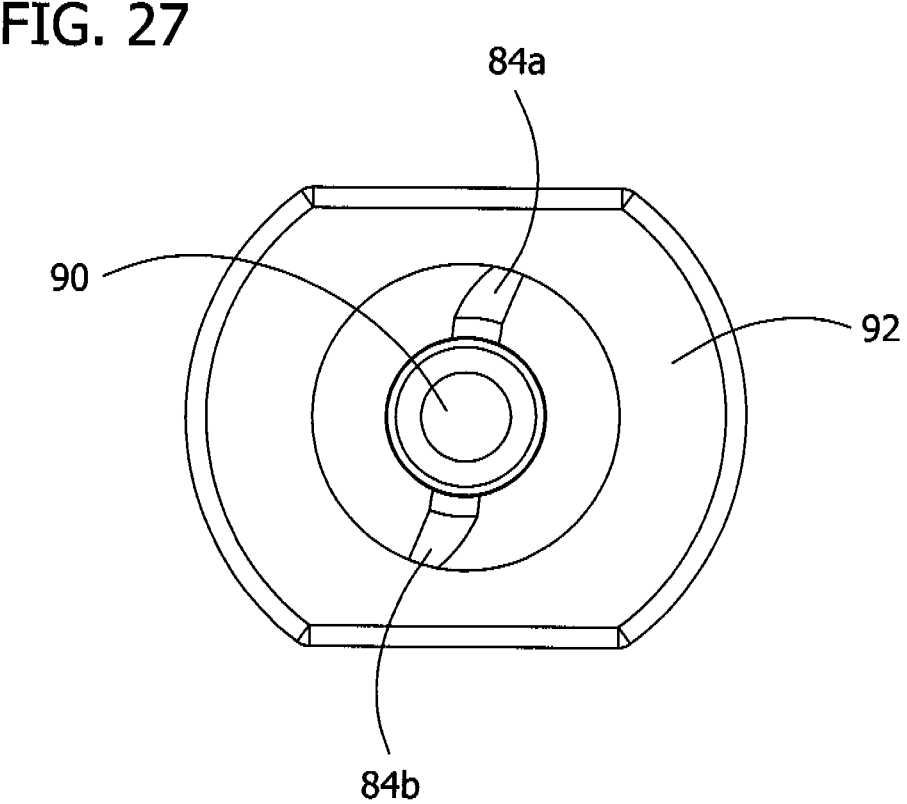
FIG. 27 is a top plan view thereof.
Figure 28:
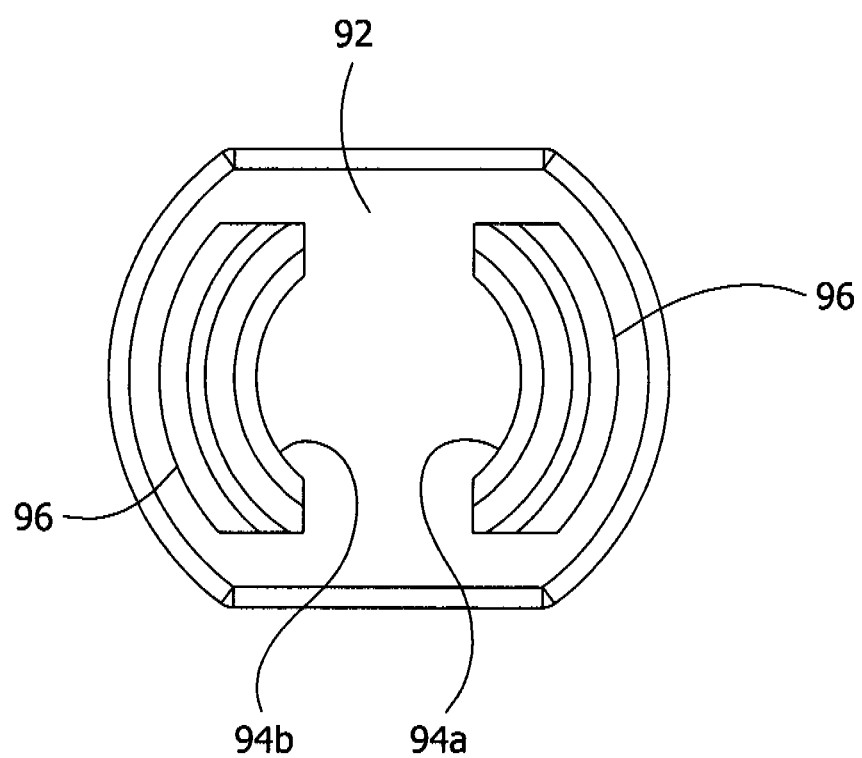
FIG. 28 is a bottom plan view thereof.
Figure 29:
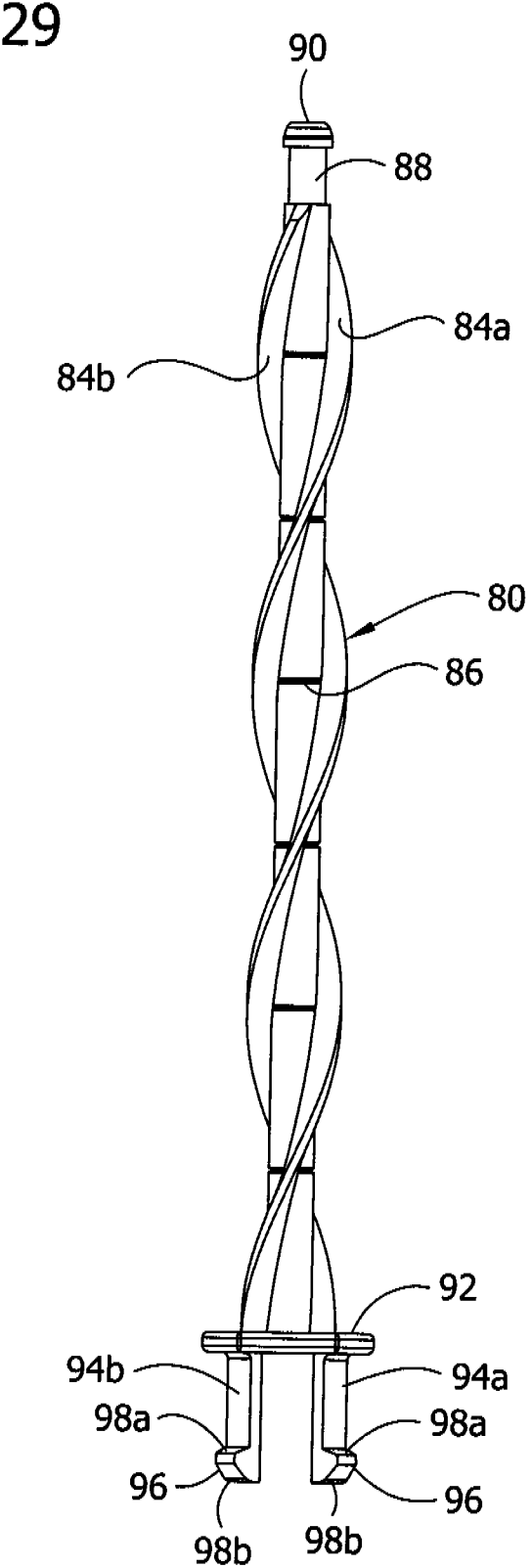
FIG. 29 is a side elevation thereof.

The gripping portion 62 is adapted to be gripped by the user during mixing of the liquids within the container 12. The gripping portion 62 is curved with a smooth, arcuate upper surface for engagement by the user's palm, and an undulating bottom surface for engagement by the user's fingers. The gripping portion 62 tapers as it extends from its center toward its ends. The connecting portion 64 of the grip 60 includes a generally cylindrical sidewall 66 and a flat bottom 68. The sidewall 66 and bottom 68 cooperatively define a cavity 72. A slot 70 extends through the sidewall 66 and bottom 68 to provide access to the cavity 72. With reference to FIG. 25, the slot 70 extending through the sidewall 66 has a greater width at a location spaced from the bottom 68 of the connecting portion 64 than a width of the slot adjacent the bottom. Two frustum extensions 74a, 74b are spaced from the slot 70 and disposed on opposite sides of the sidewall 66 from each other.

Referring now to FIGS. 26-29, the shaft 80 is elongate, having a first end releasably connectable to the grip 60 and a second end opposite the first end and releasably connectable to the agitating member 100. A pair of opposed fins 84a, 84b spiral helically around the shaft 80 intermediate the ends of the shaft. In the illustrated embodiment, each of the fins 84a, 84b extends around the shaft 80 twice but it is understood that the fins can extend around the shaft more or fewer times depending on the desired rotation of the agitating member 100. Spaced apart annular grooves 86 are provided along the length of the shaft 80.

The first end of the shaft 80 is formed to have a neck 88 and an enlarged head 90 above the neck. The second end of the shaft 80 includes a generally elliptical flange 92 and a pair of resilient fingers 94a, 94b depending from the flange. The flange 92 includes generally straight longitudinal edges and arcuate lateral edges therebetween. Each of the fingers 94a, 94b are located inward of a respective arcuate lateral edge and include a circumferential ridge 96 spaced from the flange 92. Each ridge 96 includes an upper tapered surface 98a and a lower tapered surface 98b to generally define a latch for releasably connecting the shaft 80 to the agitating member 100. The upper tapered surface 98a has a slope substantially greater than the slope of the lower tapered surface 98b.

Figure 30:
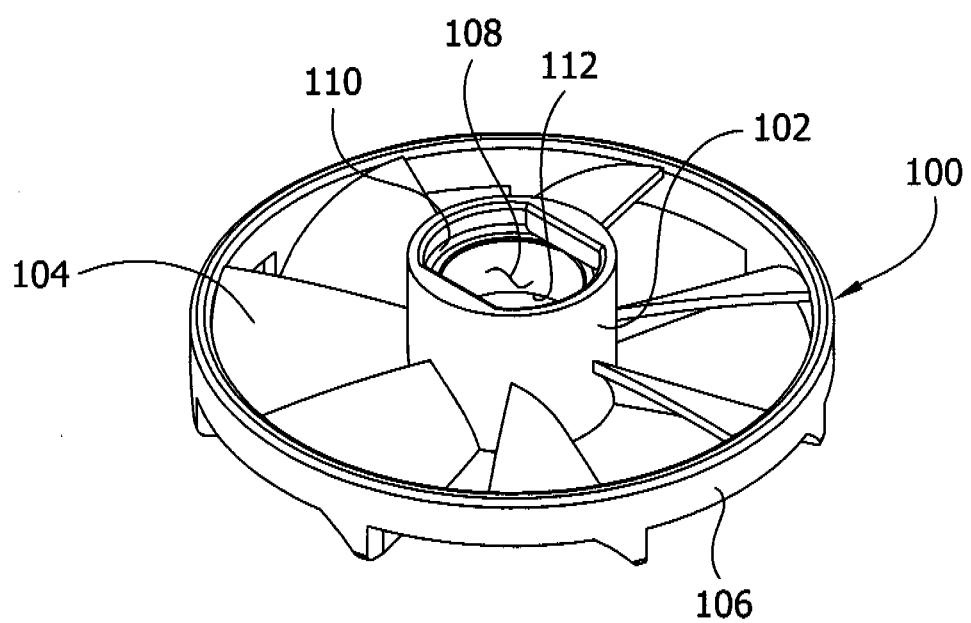
FIG. 30 is a top side perspective view of an agitating member of the mixing device.
Figure 31:
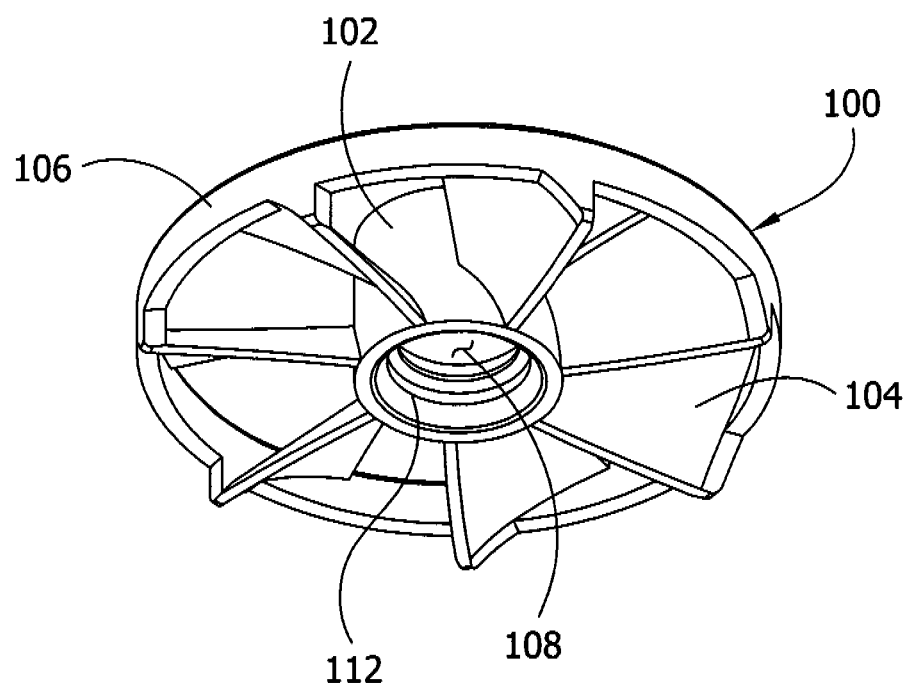
FIG. 31 is a bottom side perspective view thereof.
Figure 32:
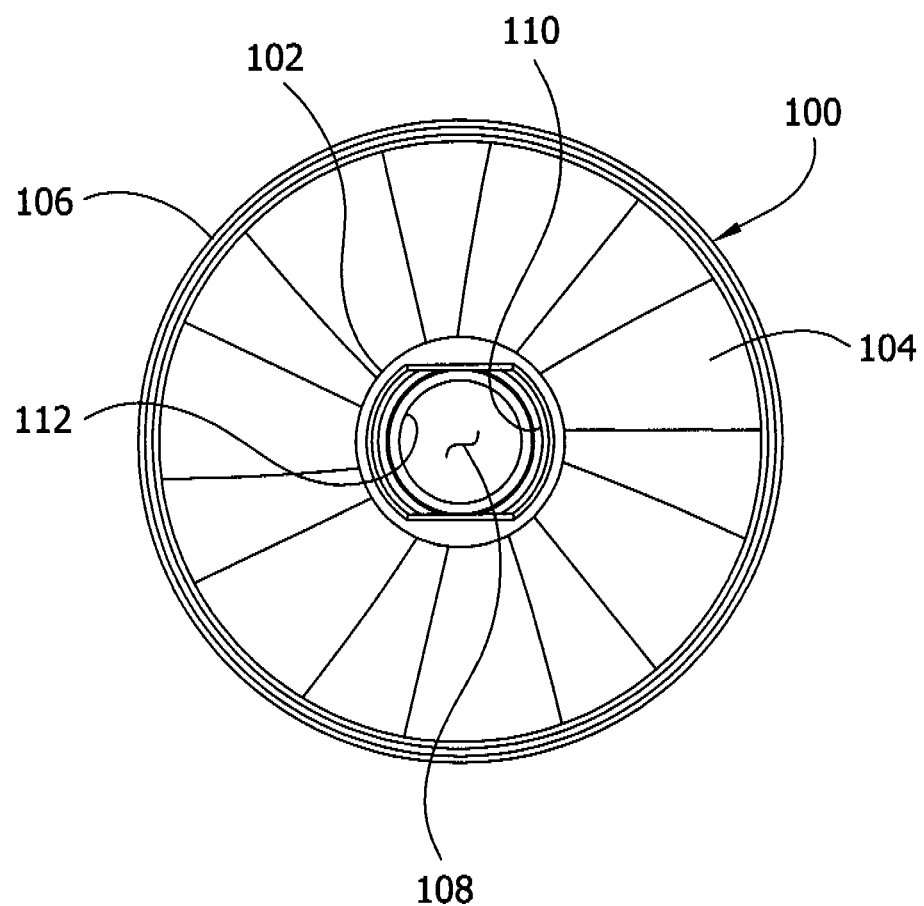
FIG. 32 is a top plan view thereof.
Figure 33:
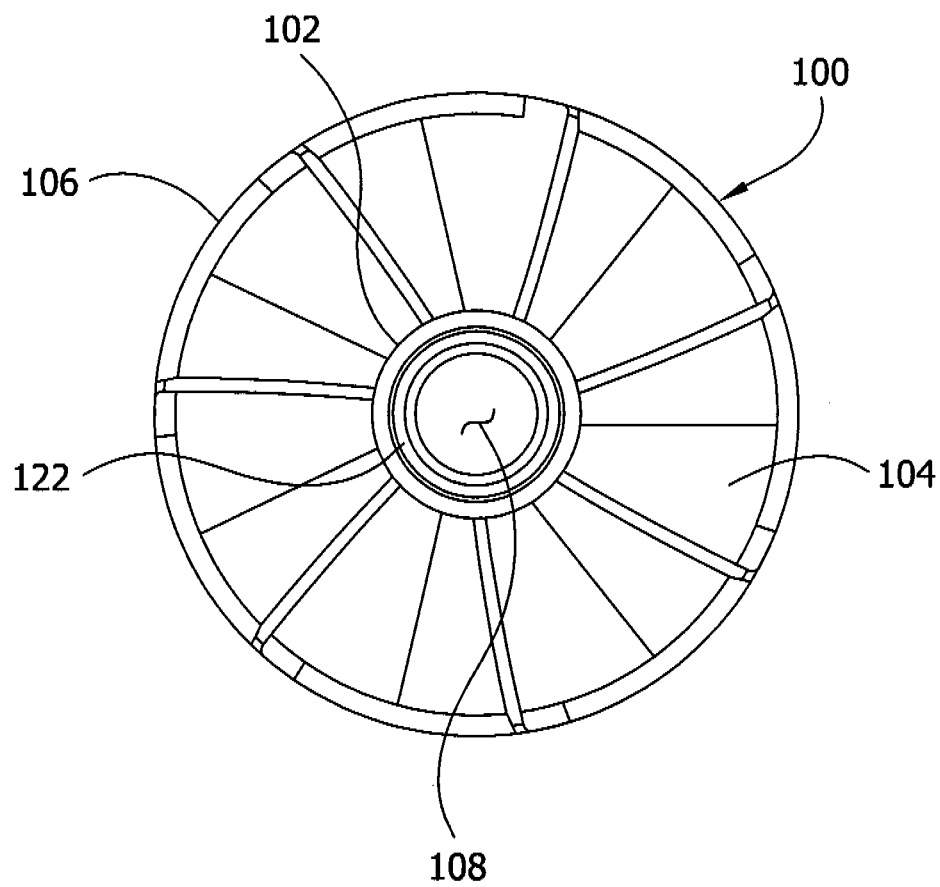
FIG. 33 is a bottom plan view thereof.
Figure 34:
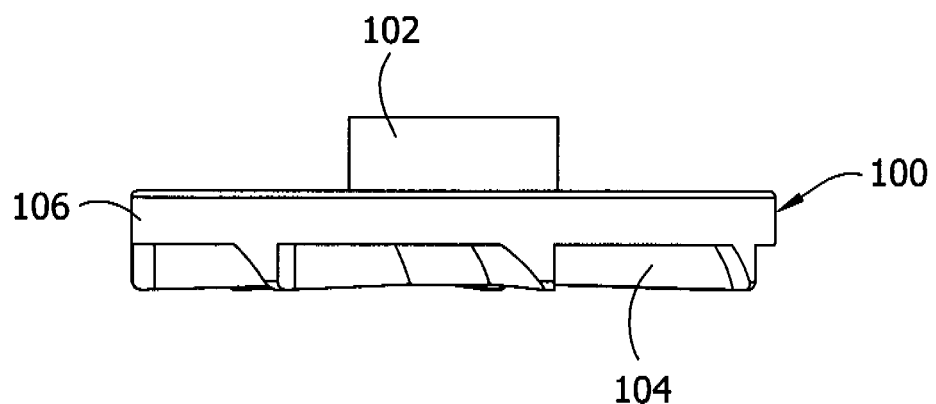
FIG. 34 is a side elevation thereof.

Referring now to FIGS. 30-34, the agitating member 100 of the mixing device 16 includes a cylindrical hub 102 having ends, a plurality of blades 104 extending outward from the hub, and an annular support 106 spaced from the hub and interconnecting each of the blades. The hub 102, which is tubular, has a passage 108 therein. An annular catch 112 extends about the interior of the hub 102 into the passage 108 at a location between the ends of the hub (FIG. 31). As shown in FIGS. 30 and 32, one end of the hub is sized and shaped for receiving the flange 92 of the shaft 80. Accordingly, the end of the hub 102 includes a socket 110 having two generally straight edges and arcuate edges extending between and interconnecting the straight edges.

In the illustrated embodiment, the agitating member 100 has seven blades 104 but it is understood that more or fewer blades can be used. Each of the blades 104 is disposed at an angle with respect to the hub 102 and annular support 106. Since each of the blades 104 is also curved along its length, the angle of the blade at the location where the blade contacts the hub 102 is substantially different than the angle of the blade at the location where the blade contacts the annular support 106. It is understood that the blades 104 can have different configurations and orientation than those illustrated herein.

In the illustrated configuration, the annular support 106 is connected to the outer edges of each of the blades 104 but it is understood that the annular support could be located closer to the hub 102. It is also contemplated that the annular support 106 can interconnect fewer blades 104. For example, the annular support 106 can be configured to interconnect every other blade 104 or every third blade. It is further contemplated that the annular support 106 could be omitted without departing from the scope of this invention. The agitating member 100 of the illustrated configuration is formed as a single piece. That is, the hub 102, blades 104, and annular support 106 are formed as one piece, e.g., by molding. It is understood, though, that the agitating member 100 may be formed from two or more pieces and assembled together.

Figure 35:
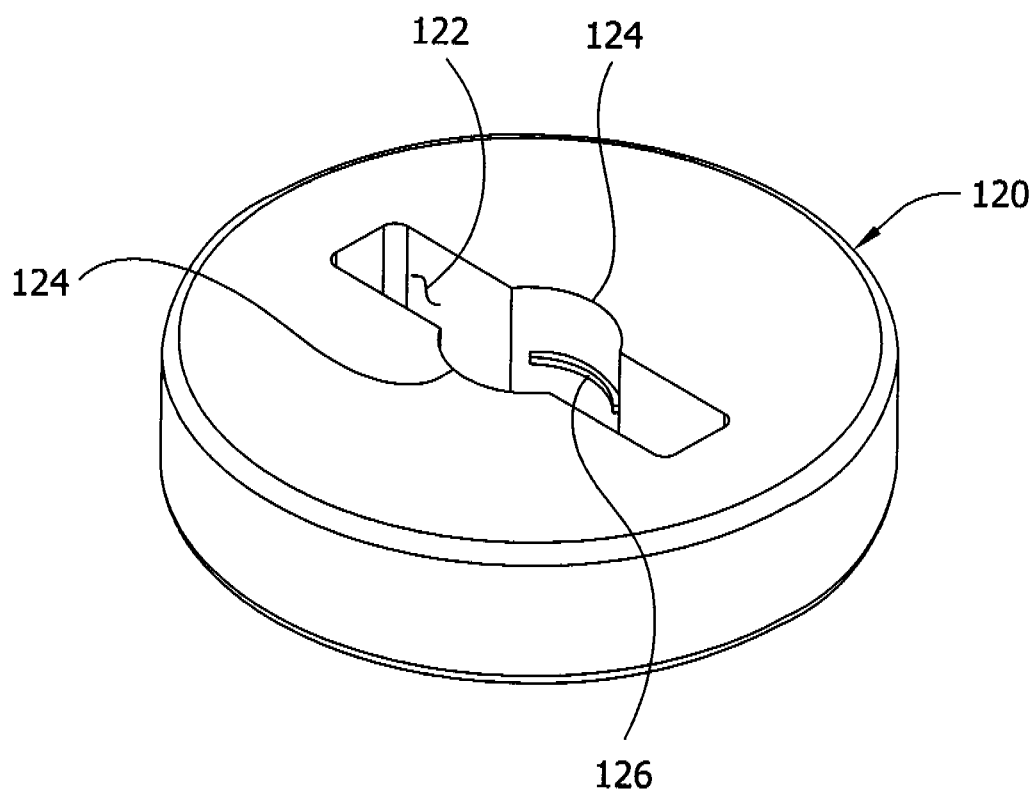
FIG. 35 is a perspective view of a stop of the mixing device.
Figure 36:
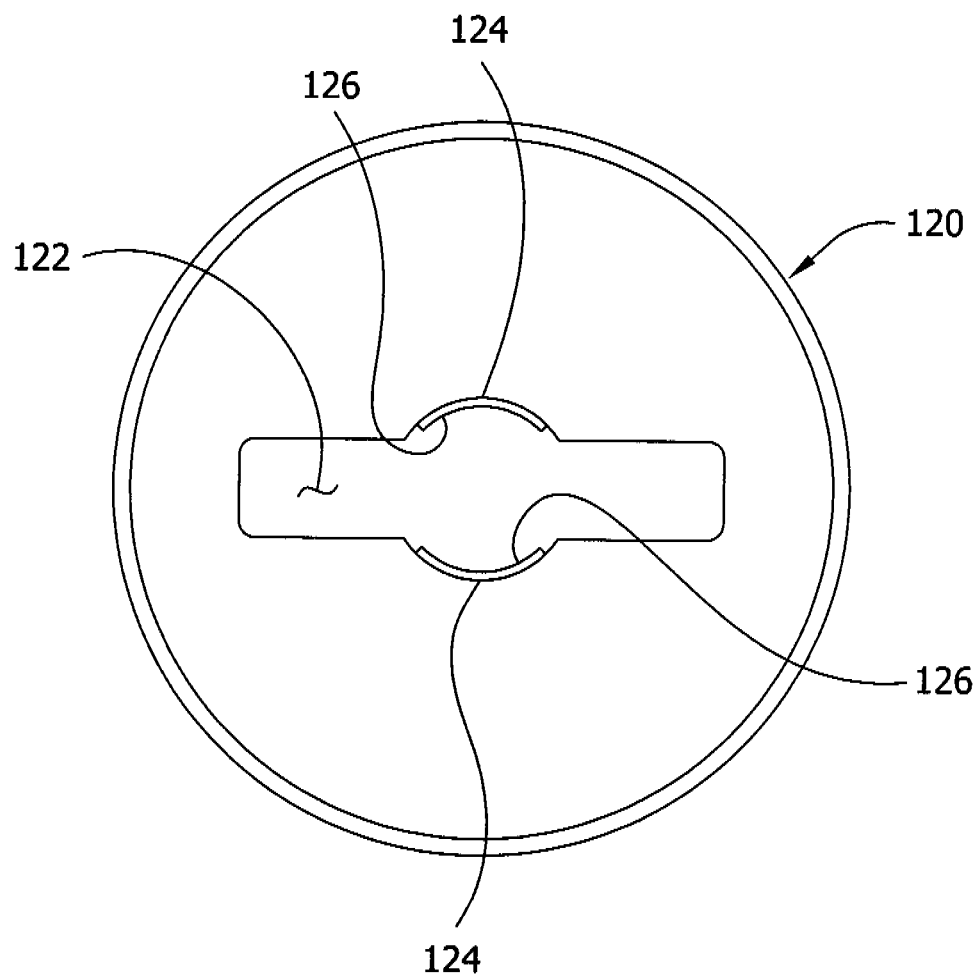
FIG. 36 is a top plan view thereof.
Figure 37:
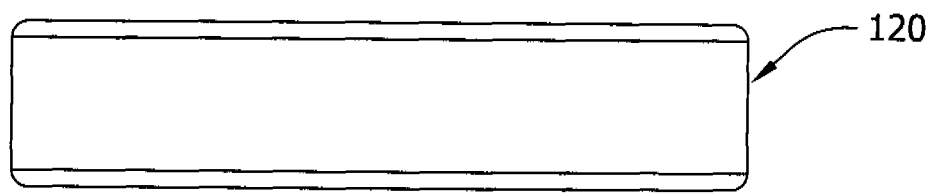
FIG. 37 is a side elevation thereof.

With reference to FIGS. 35-37, the stop 120 has a central opening 122 formed therein along with a pair of key slots extending radially from opposite sides of the opening. The central opening is sized to accommodate the shaft 80 therethrough with the fins 84a, 84b of the shaft disposed in the key slots. Opposed engagement ribs 126 are located on the inner wall of the stop 120 at the central opening 122 to extend inward of the opening. The ribs 126 are configured for seating in the respective grooves 86 in the shaft 80 to releasably secure the stop at a desired location along the shaft. The stop 120 can thus be selectively moved along the shaft 80 and secured in place by aligning the engagement ribs 126 with one of the grooves 86 in the shaft so that the engagement ribs are received in the groove. It is understood that the stop 120 can have different configurations.

Figure 43:
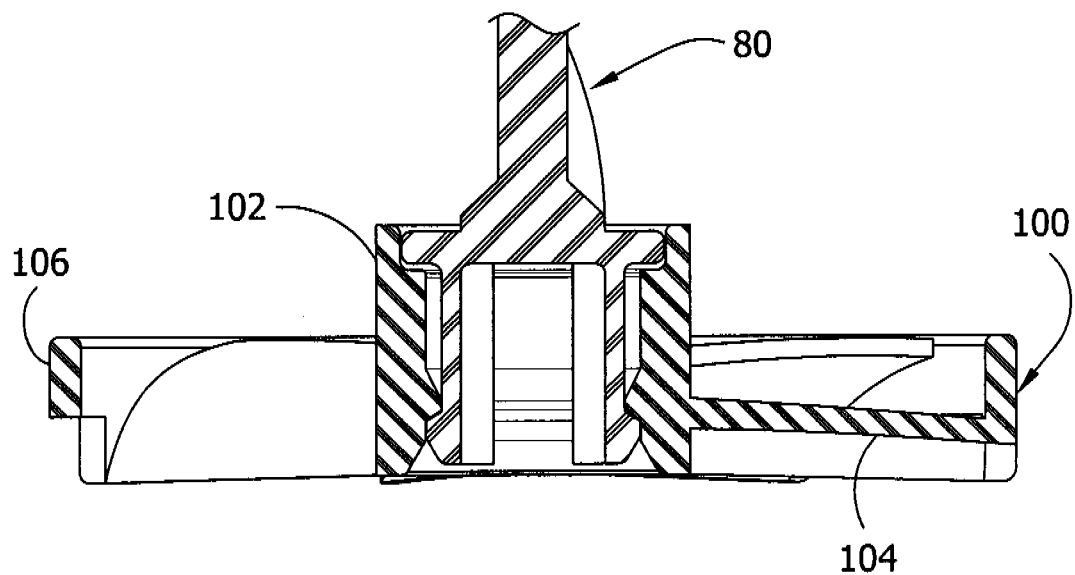
FIGS. 43 and 44 are enlarged sections similar to FIG. 41 but showing the agitating member in the process of being disconnected from the shaft.
Figure 44:
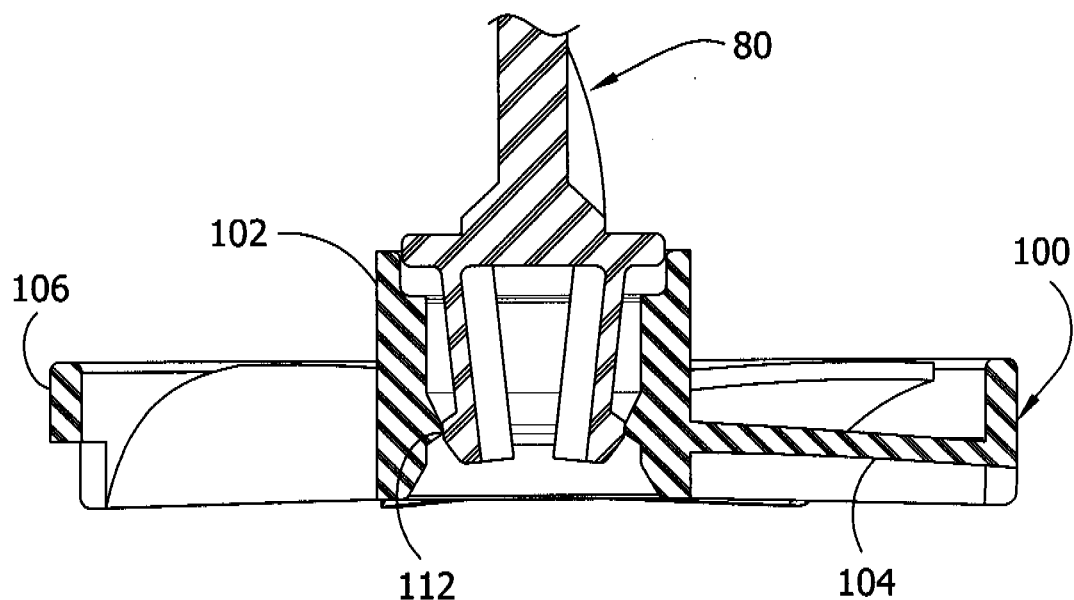
Figure 45:
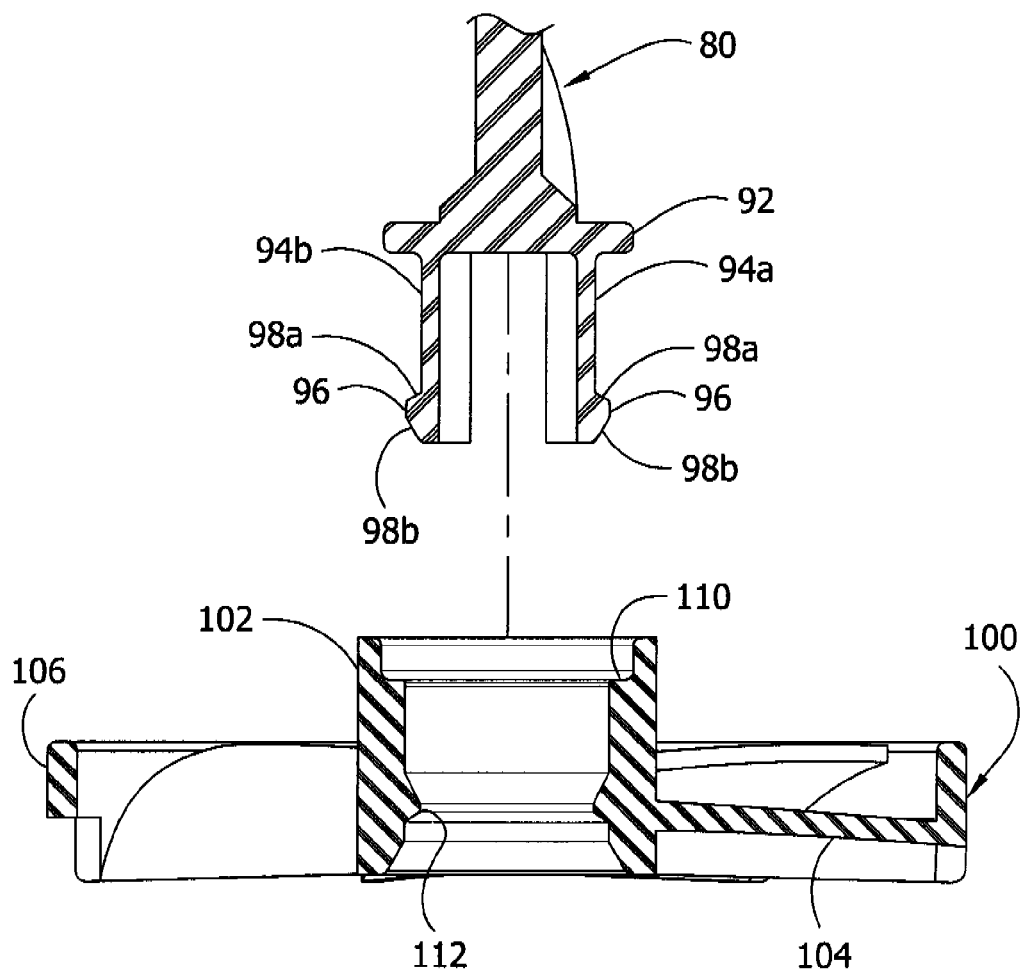
FIG. 45 is an enlarged section similar to FIG. 44 but showing the agitating member disconnected from the shaft.
Figure 46:
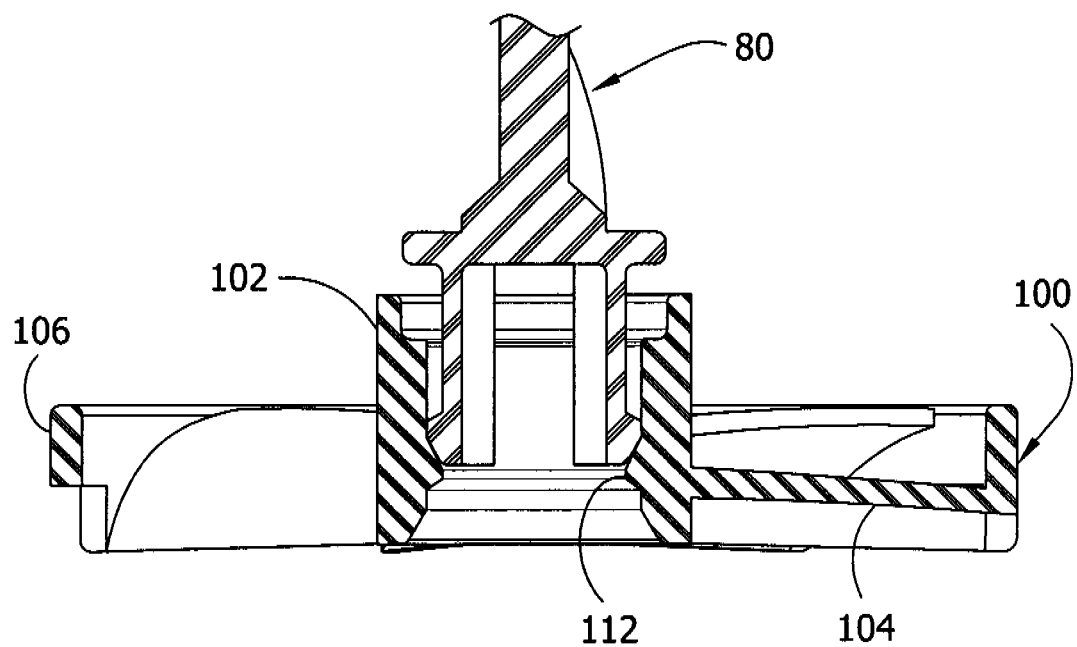
FIG. 46 is an enlarged section similar to FIG. 45 but showing the agitating member in the process of being connected to the shaft.

In use, the user fills the container 12 with the desired amount of water (or other liquid) and adds powered formula (or other material to be mixed) into the container. If not already assembled, the user assembles the mixing device 16 by connecting the agitating member 100, stop 120, and grip 60 to the shaft 80. In particular, the agitating member 100 is connected to the shaft 80 by inserting the fingers 94a, 94b of the shaft into the passage 108 of the hub 102 of the agitating member. See FIGS. 40-46. As the fingers 94a, 94b are pushed into the passage 108, the lower tapered surfaces 98b of the ridges 96 of the fingers engage (FIG. 46) and slide over the catch 112 (FIG. 44). The fingers 94a, 94b are thereby bent toward each other which allows the ridges 96 of the fingers to pass the catch 112, as shown in FIG. 44. Once the ridges 96 of the fingers 94a, 94b pass the catch 112, the fingers 94a, 94b spring back to approximately their initial configuration thereby allowing the ridges 96 on the fingers and the catch 112 on the hub 102 to cooperatively secure the agitating member 100 to the shaft 80 (FIG. 43) for conjoint translation with the shaft relative to the container 12. The generally elliptical flange 92 of the shaft 80 is received in the socket 110 of the hub 102 to operatively connect the agitating member 100 to the shaft for conjoint rotation therewith relative to the container 12. It is understood, however, that the agitating member 110 and shaft 80 may be instead permanently connected to each other or releasably connected to each other in ways different than those disclosed herein without departing from the scope of this invention.

Figure 4:
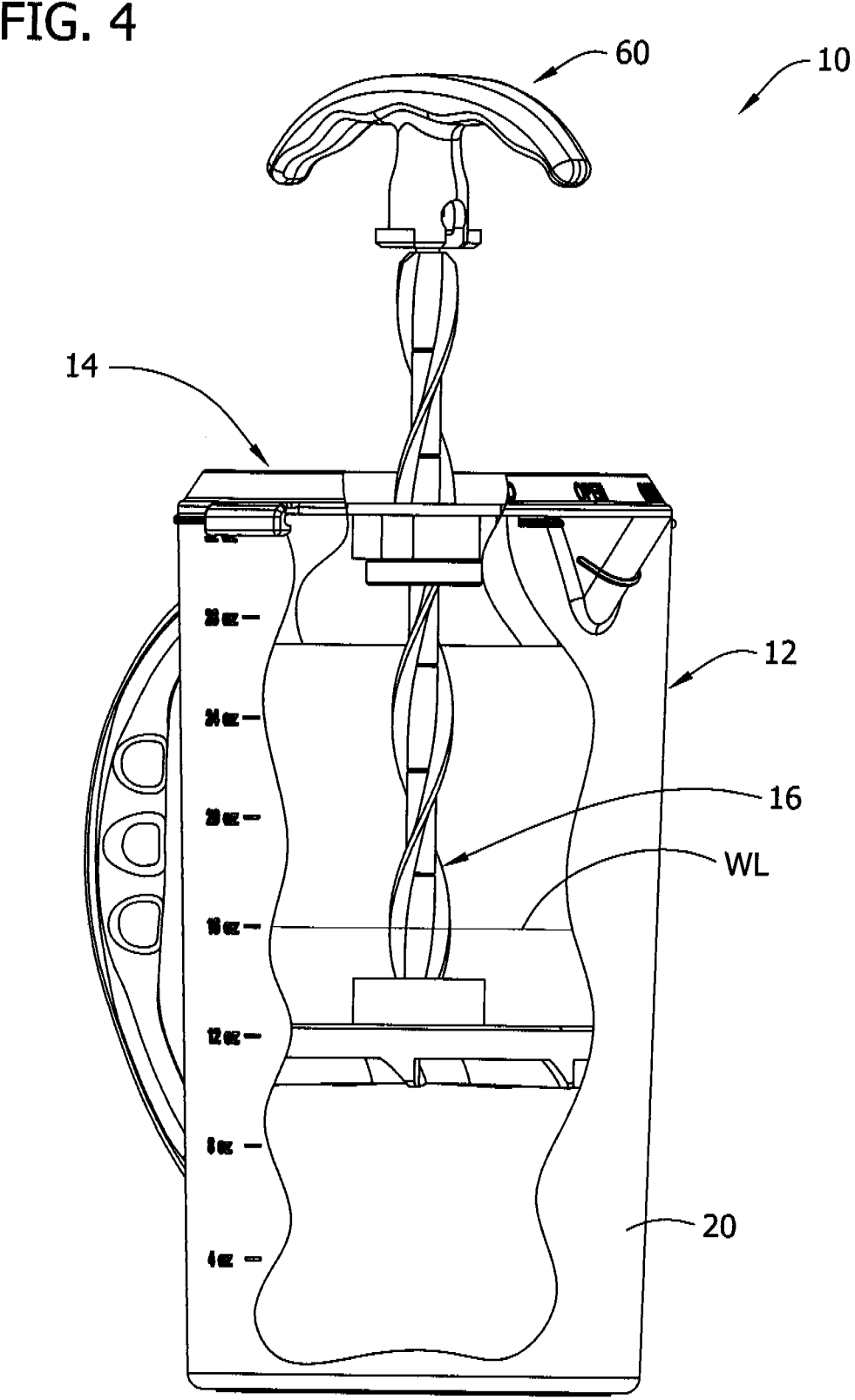
FIG. 4 is a side elevation illustrating the relative position of the mixing device in its raised position with respect to the level of liquid in the container.
Figure 5:
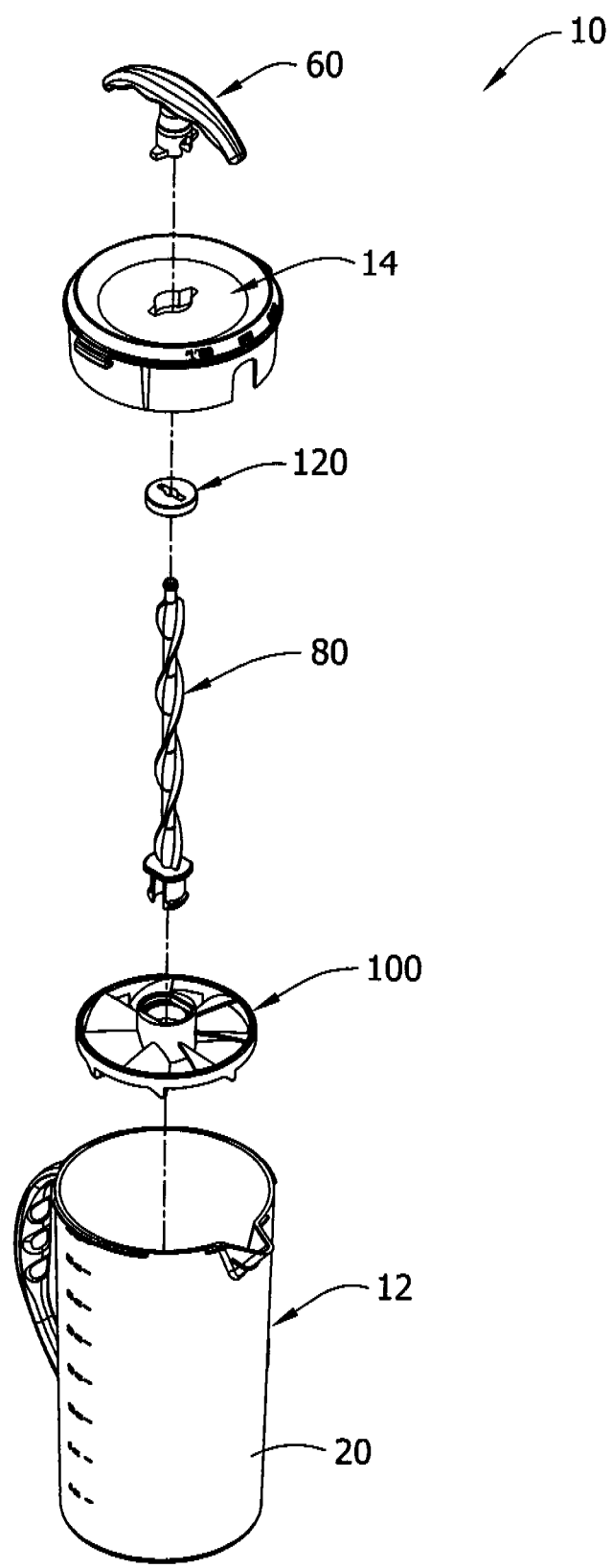
FIG. 5 is an exploded perspective view of the pitcher.
Figure 6:
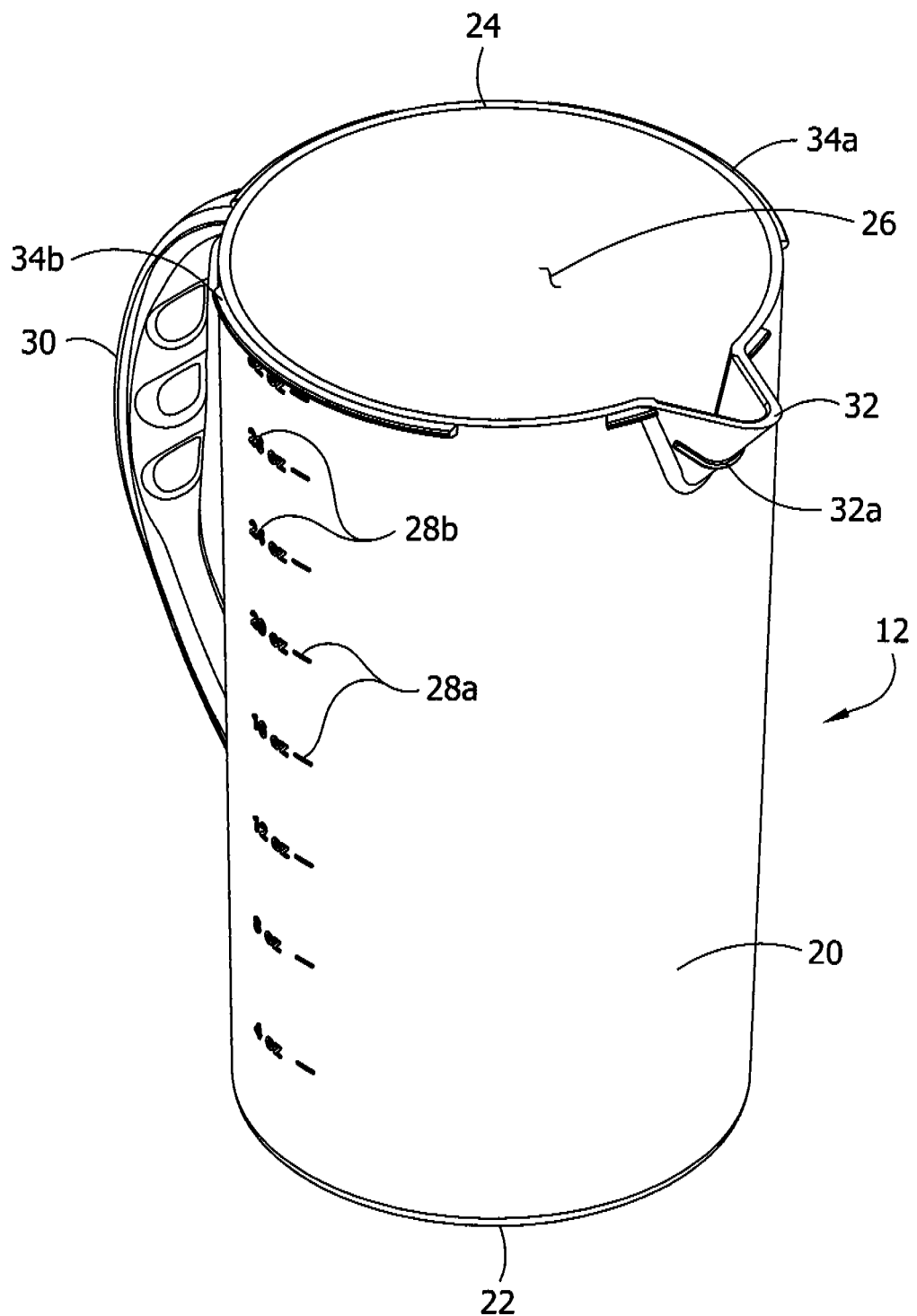
FIG. 6 is a perspective view of the container with the lid and mixing device removed.
Figure 7:
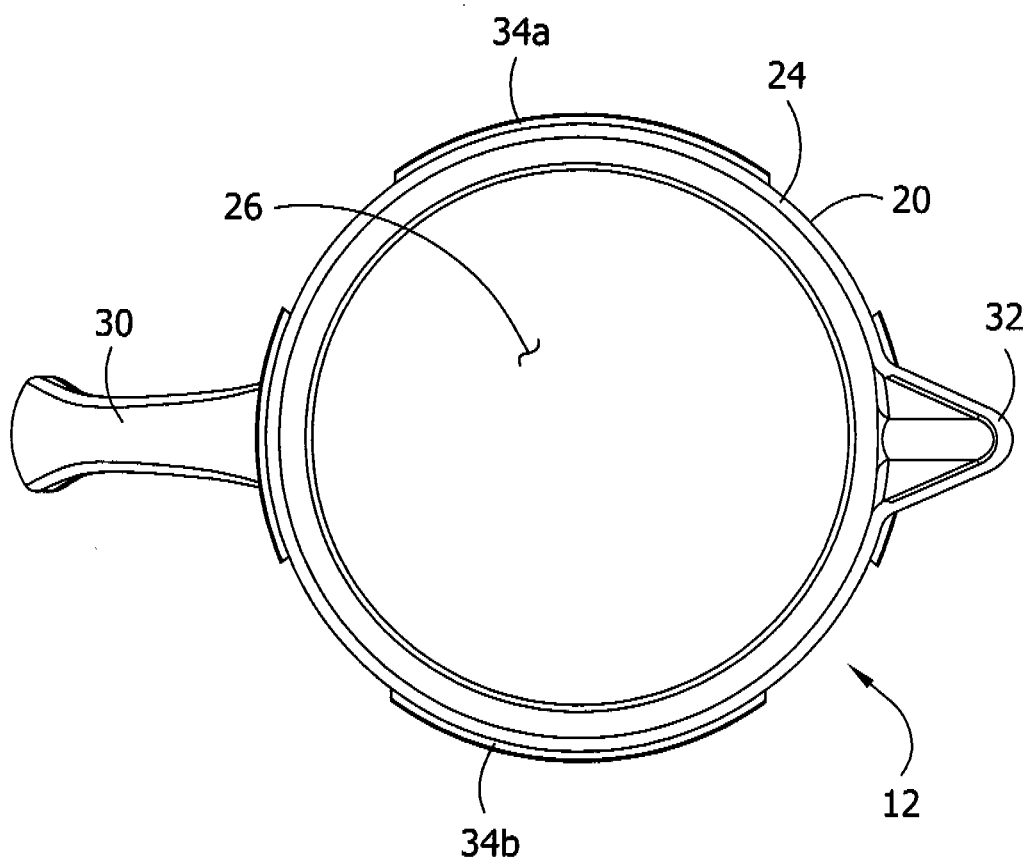
FIG. 7 is a top plan view thereof.
Figure 8:
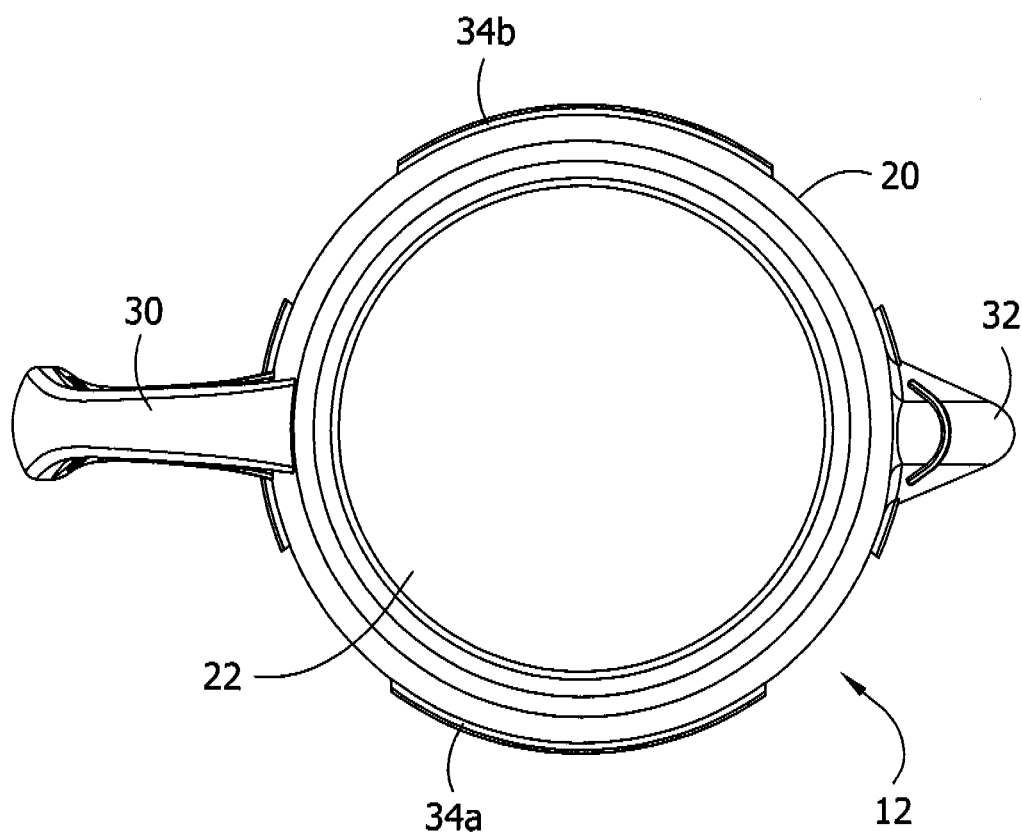
FIG. 8 is a bottom plan view thereof.
Figure 9:
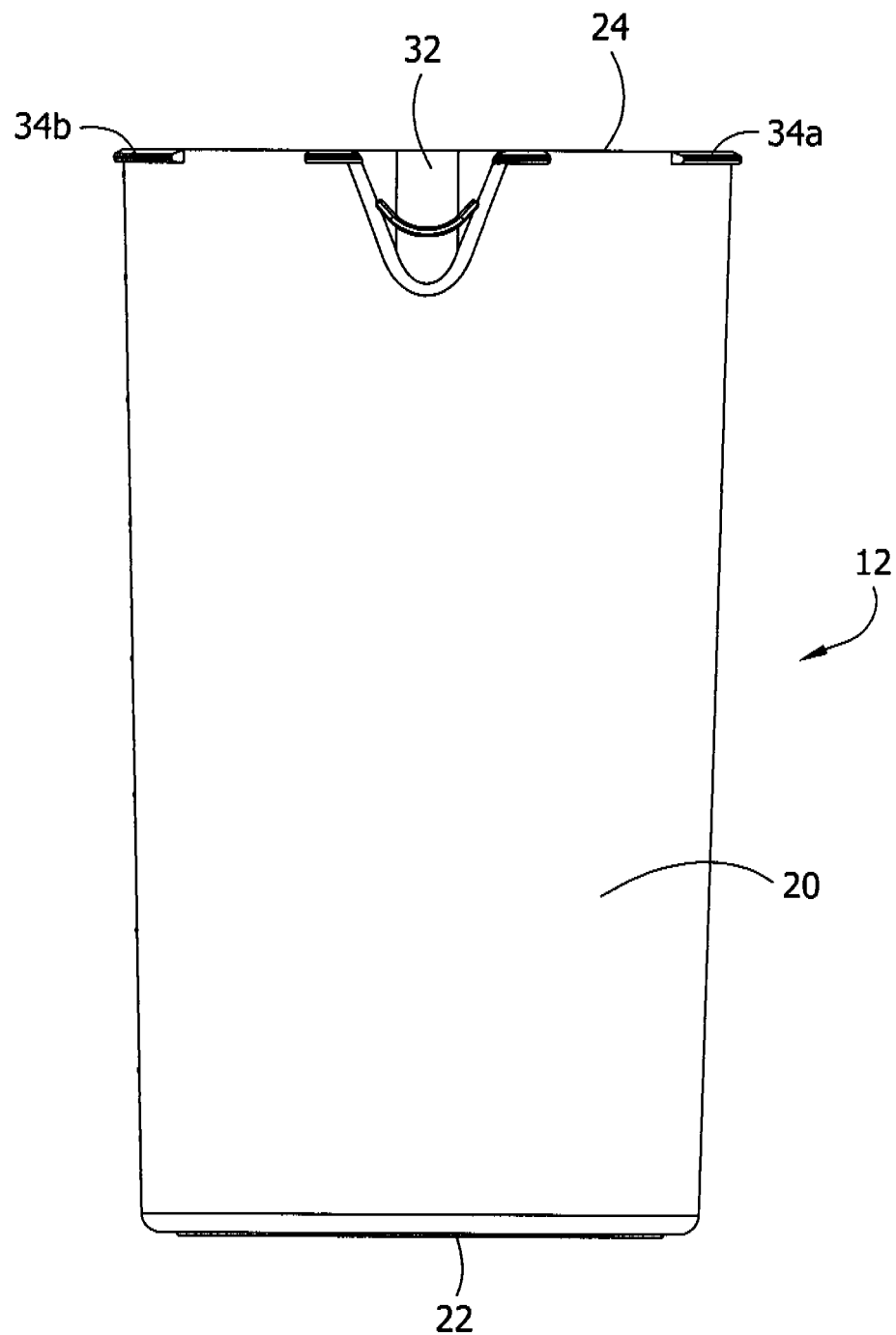
FIG. 9 is a front elevation thereof.
Figure 10:
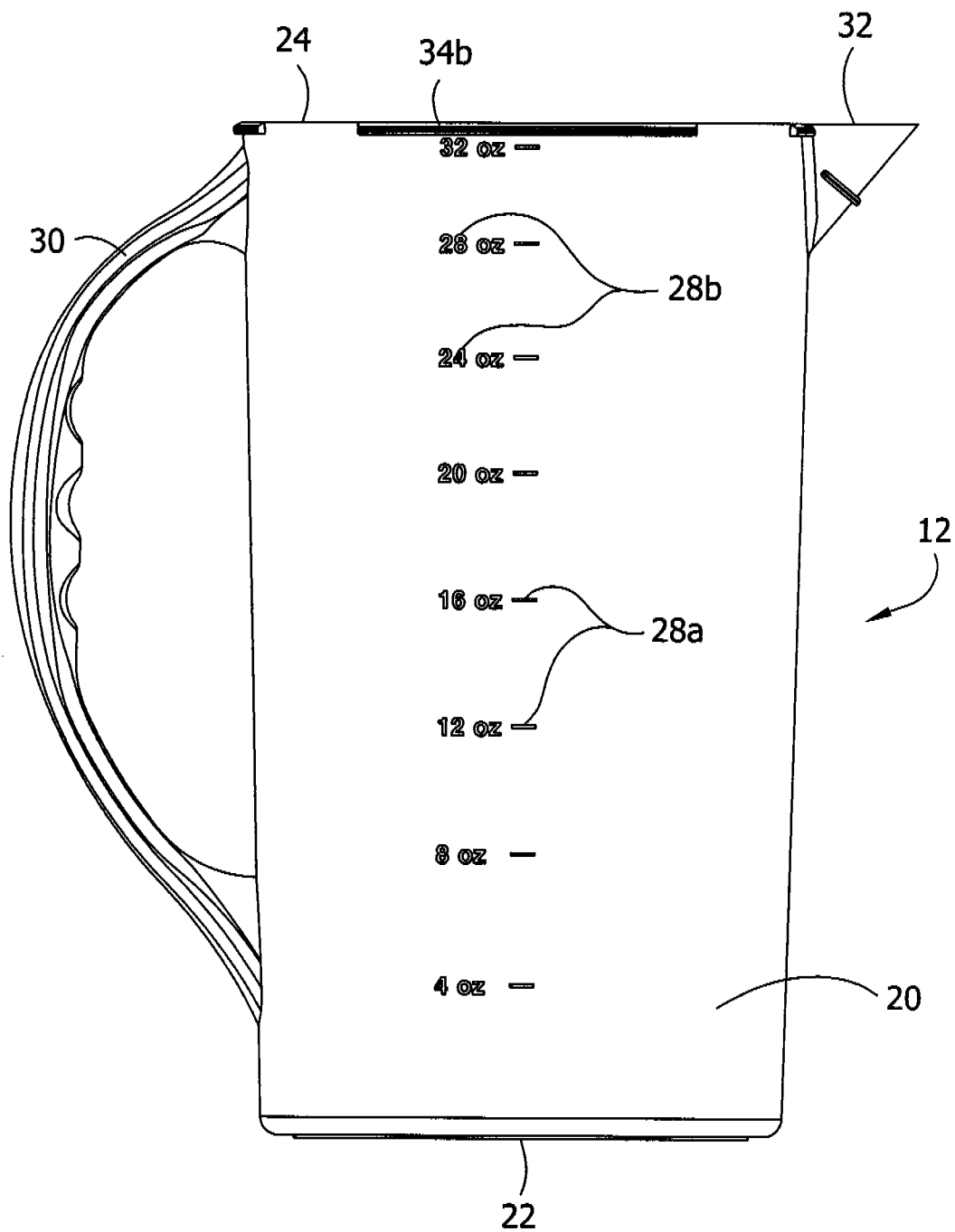
FIG. 10 is a right side elevation thereof.
Figure 11:
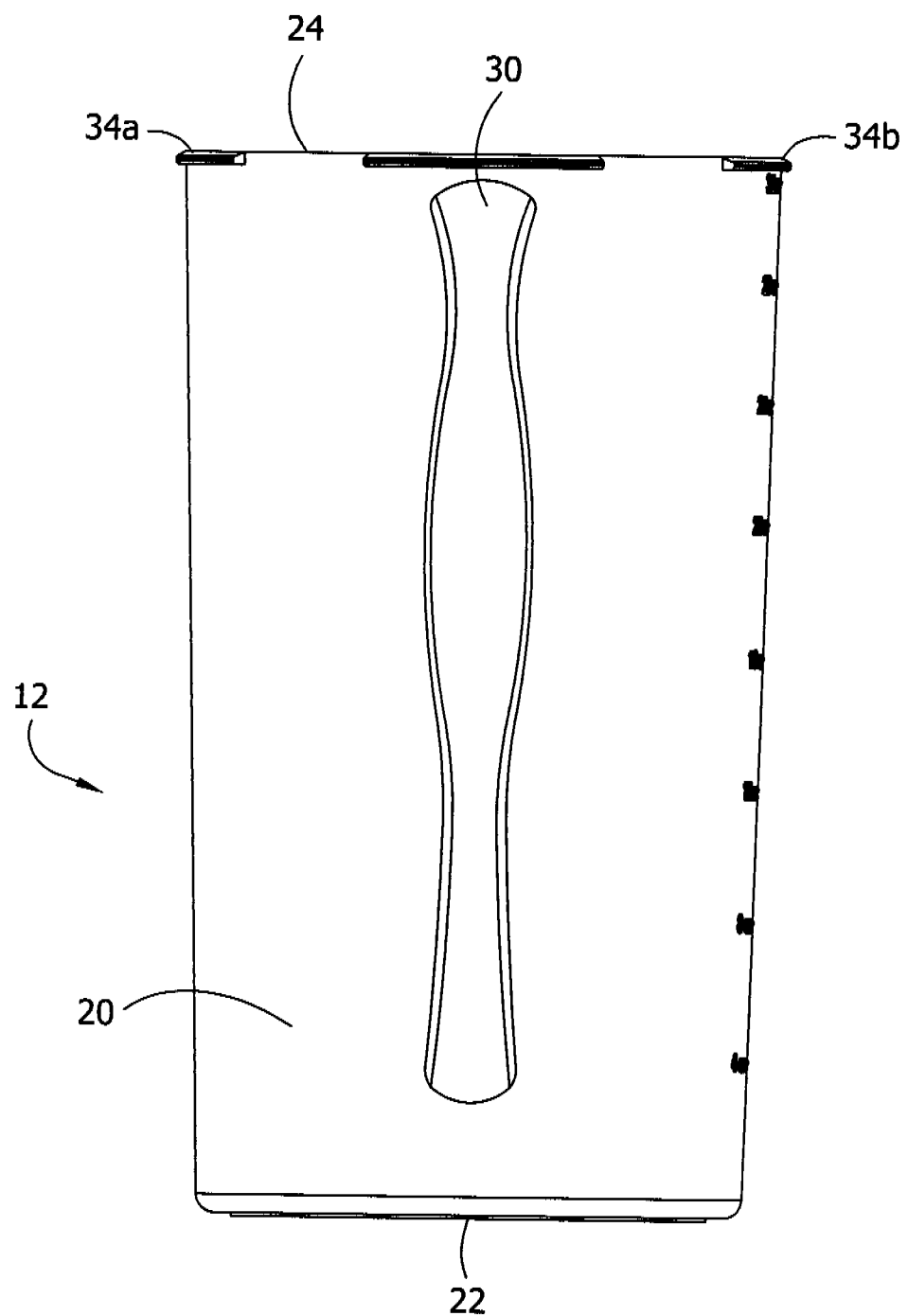
FIG. 11 is a rear elevation thereof.

The stop 120 is suitably located on the shaft 80 at a groove 86 location that corresponds to the level of liquid in the container or less. As a result, upon translation the stop 120 prevents the agitating member 100 from being pulled above the water line WL (FIG. 4).

Figure 47:
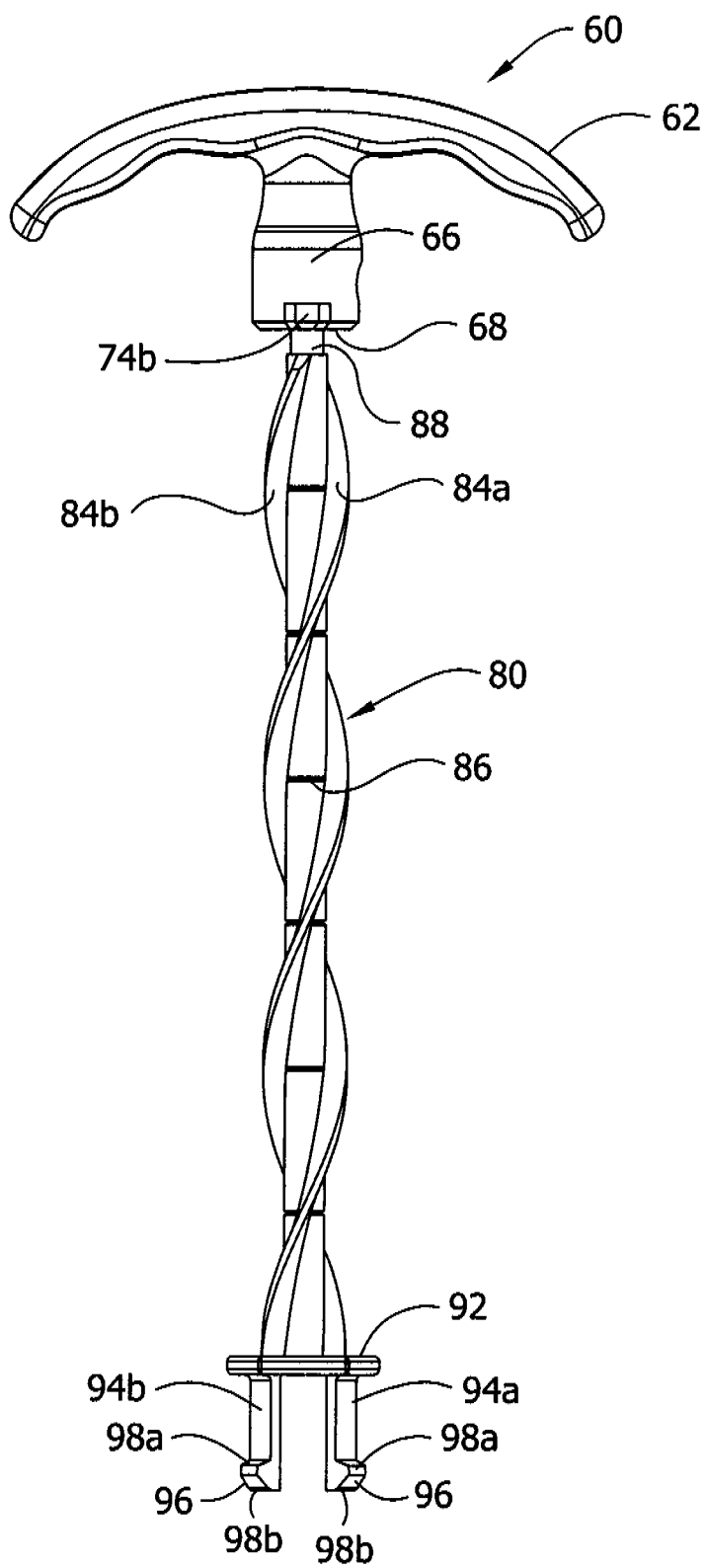
FIG. 47 is a side elevation of the handle connected to the shaft.
Figure 48:
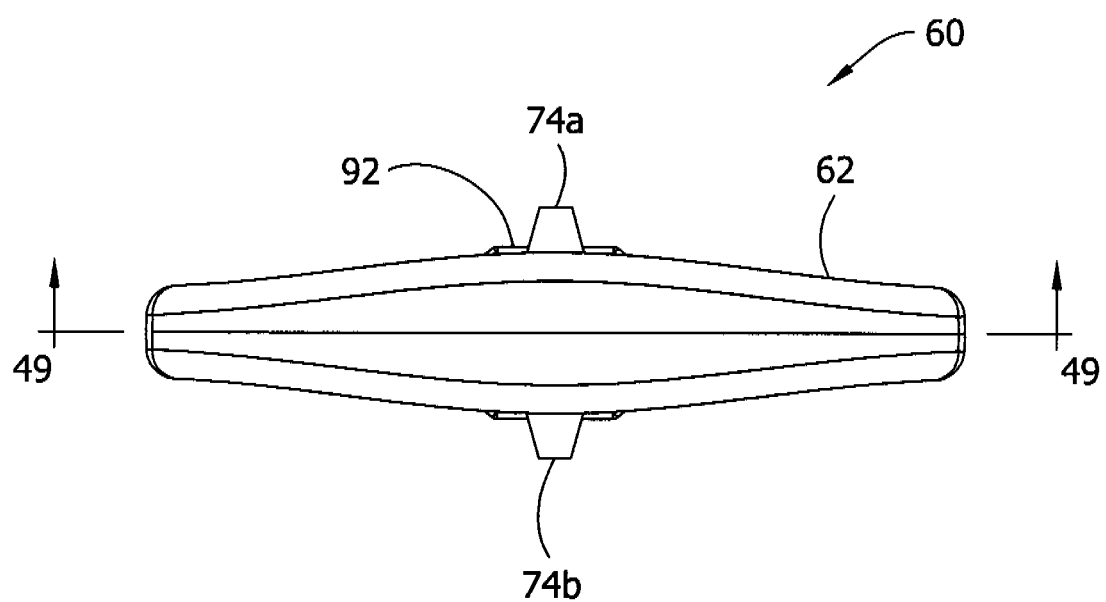
FIG. 48 is a top view thereof.
Figure 49:
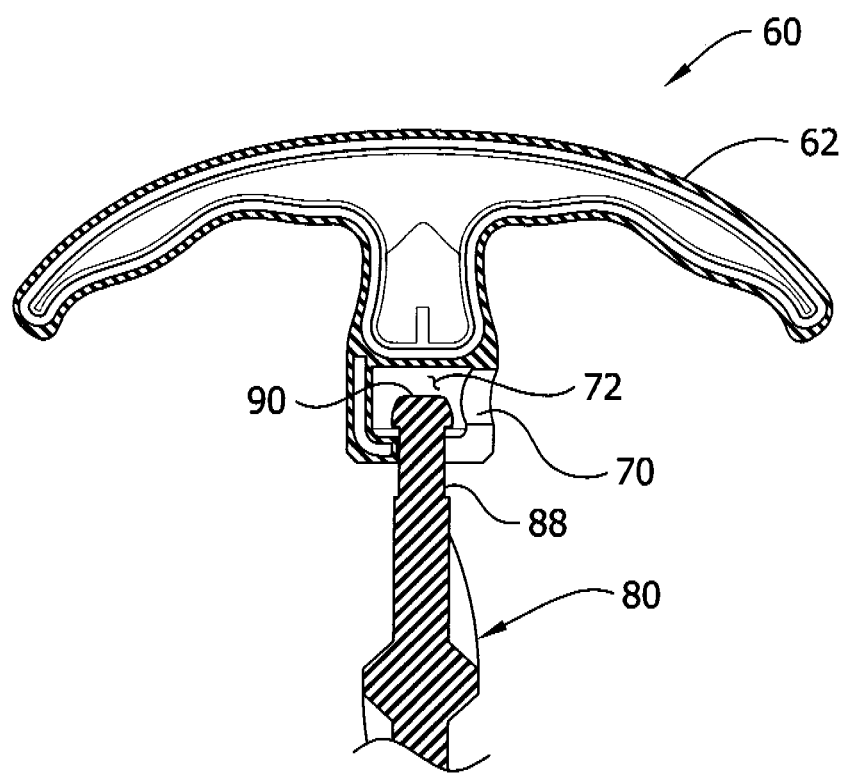
FIG. 49 is an enlarged section taken in the plane of line 49-49 of FIG. 48.

The shaft 80 is inserted through the opening 43 in the lid 14 so that the fins 84a, 84b of the shaft are received in the respective key slots 43b of the opening 43 in the lid and the shaft 80 is received in the central portion 43a of the opening. The grip 60 is releasably connected to the shaft 80 by inserting the head 90 and neck 88 of the shaft transversely through the slot 70 in the grip. The head 90 aligns with the wider portion of the slot 70 and the neck 88 aligns with the narrow portion. Once in place, the head 90 is received in the cavity 72 in the grip 60, which connects the grip to the shaft (FIGS. 47-49). This connection allows the shaft 80 to rotate independently of the grip 60 while allowing the shaft to translate (i.e., move up and down) with the grip.

It is understood that the grip 60 and shaft 80 can be permanently connected to each other or releasably connected to each other in ways different than those disclosed herein without departing from the scope of this invention.

Figure 38:
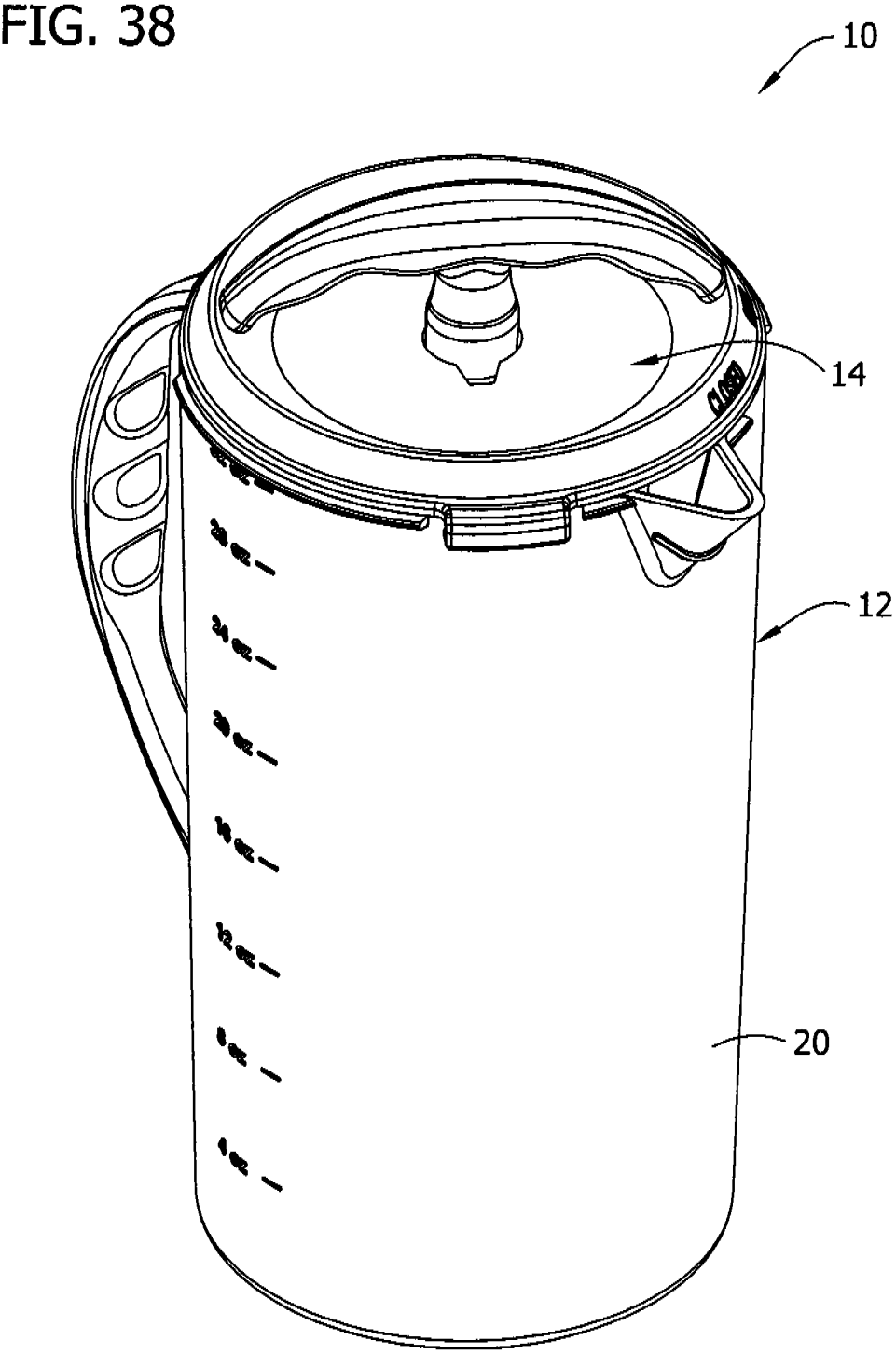
FIG. 38 is a perspective view similar to FIG. 1 but with the lid in an unlocked position.
Figure 39:
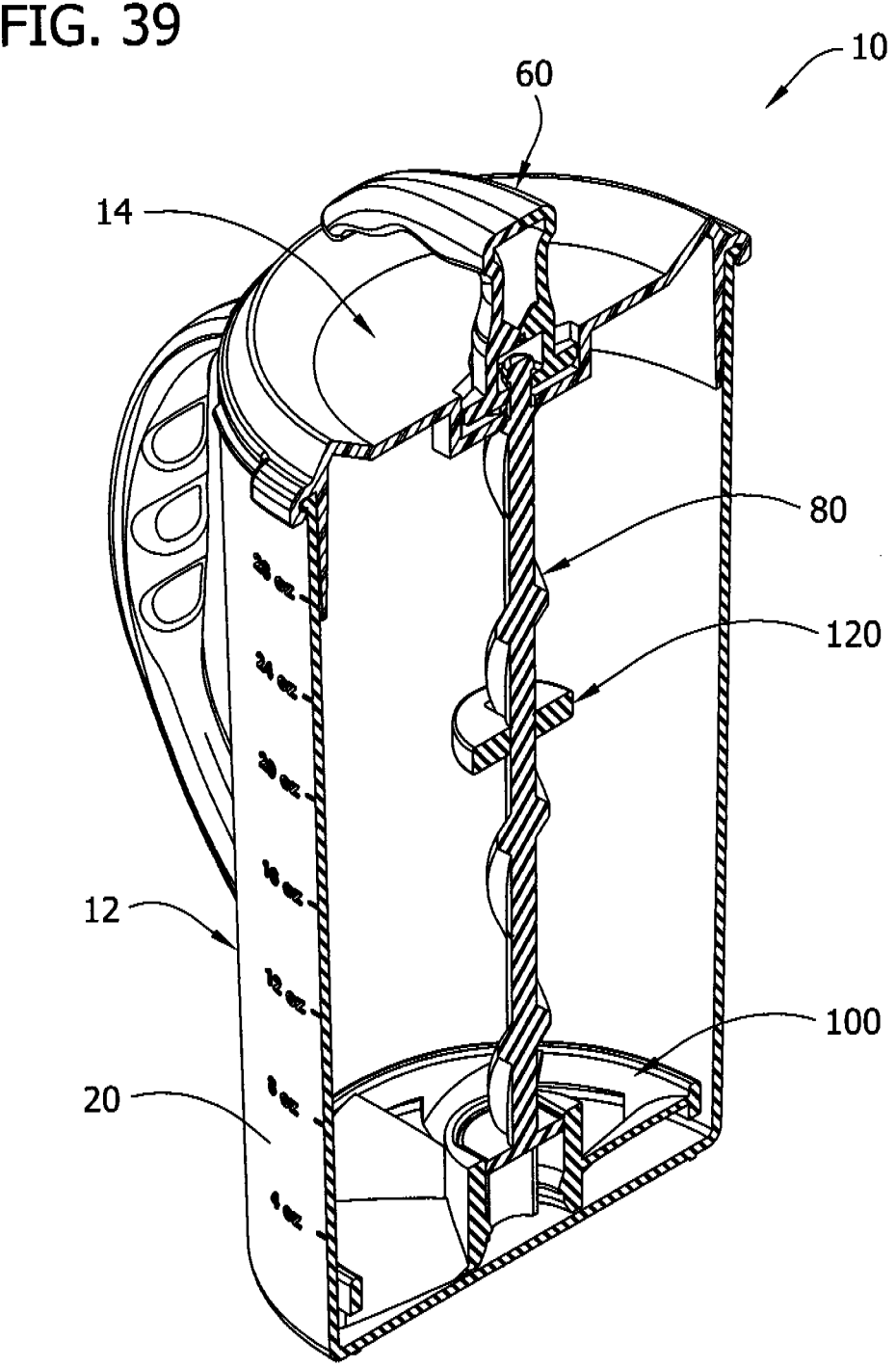
FIG. 39 is a section taken in the plane of line 39-39 of FIG. 1.
Figure 40:
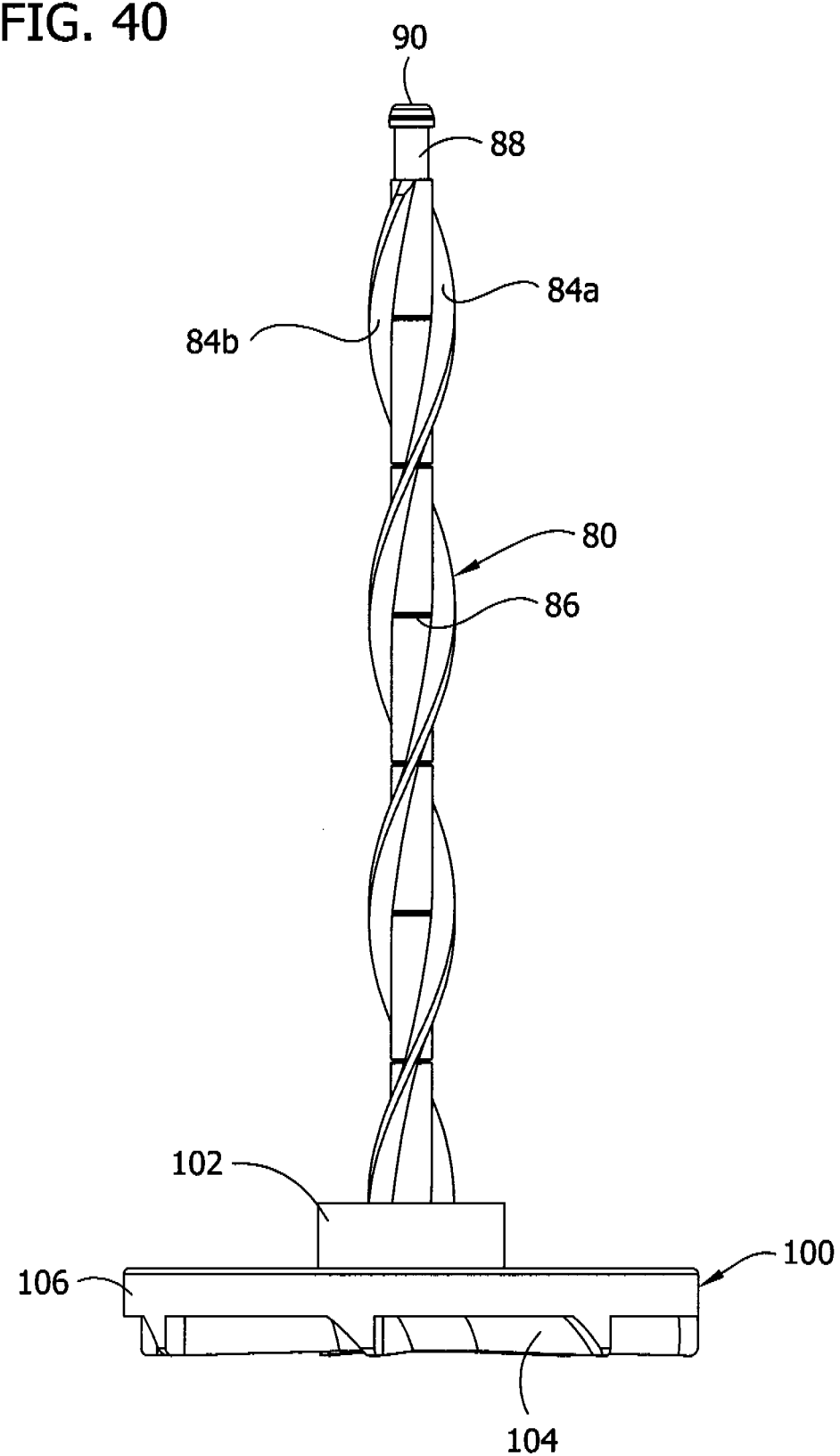
FIG. 40 is an elevation of the agitating member connected to the shaft.
Figure 41:
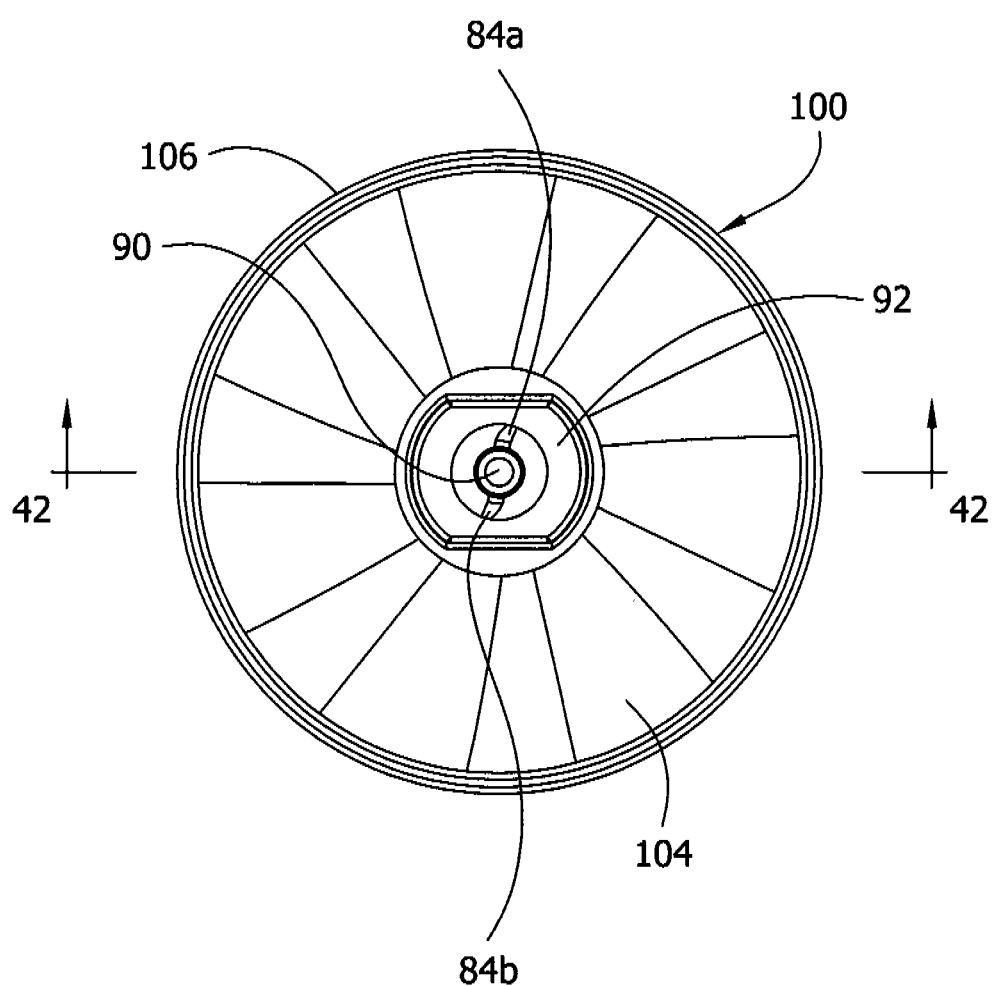
FIG. 41 is a top view thereof.
Figure 42:
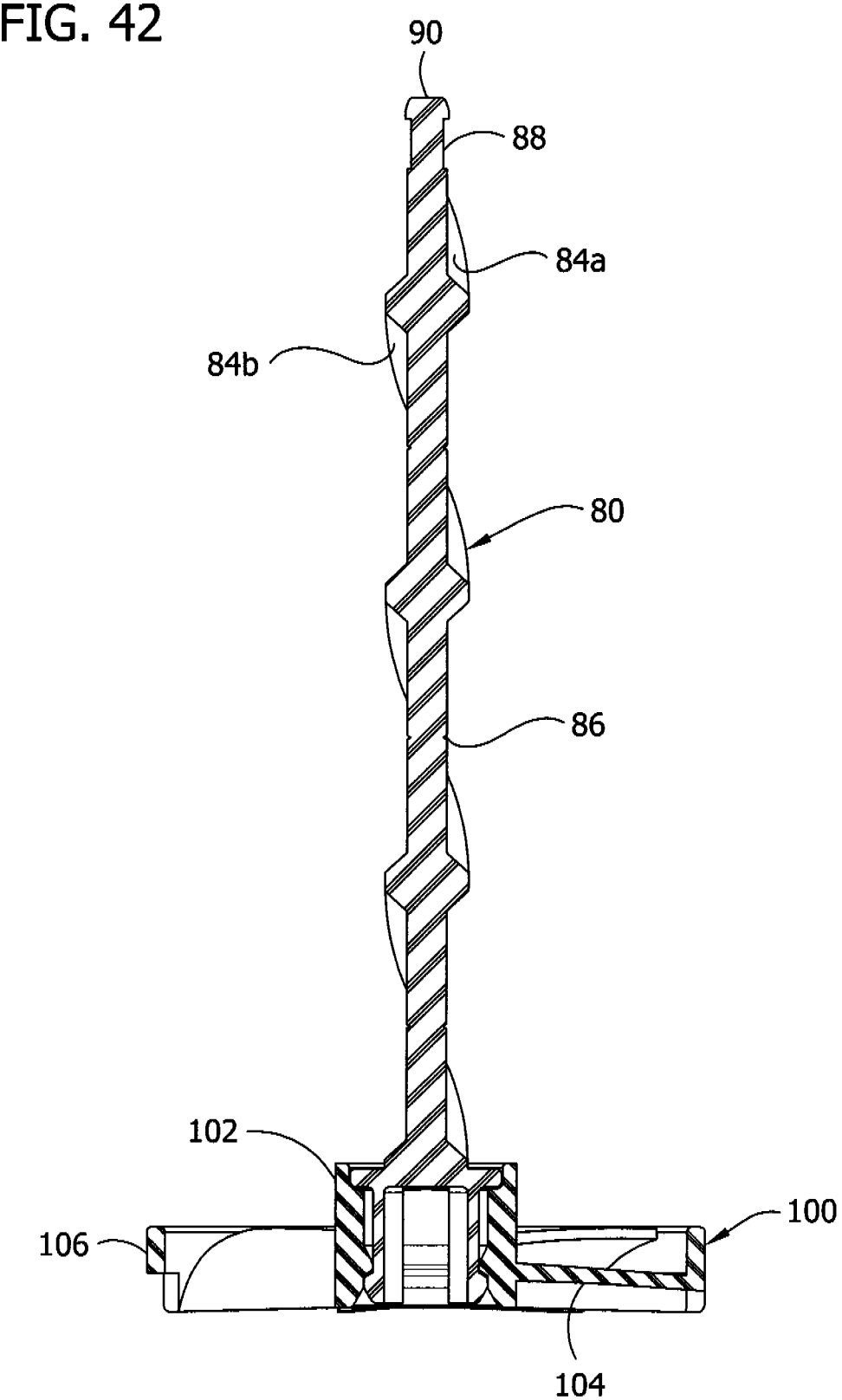
FIG. 42 is a section taken in the plane of line 42-42 of FIG. 41.

The lid 14 is placed on the container 12 by aligning the tabs 56 circumferentially away from the rails 34a, 34b of the container (FIG. 38) and then rotating the lid in clockwise direction so that the rails are received in the channels 58 of the tabs (FIG. 39) to lock the lid on the container. The lid 14 is placed on the container 12 so that the sidewall 52 of the lid is received in the interior volume 26 of the container against the sidewall of the container adjacent the top of the container. With the rails 34a, 34b of the container 12 receiving the channels 58 in the tabs 56 of the lid 14, the lid is fixed against removal from the container. However, the lid 14 is still rotatable while on the container 12 to open and close access to the spout 32. It is understood that the lid 14 may be releasably secured to the container 12 in different ways.

To operate the mixing device 16, the user grasps the grip 60 and cyclically pulls it upward (i.e., away from the lid 14) and pushes it downward (i.e., toward the lid). This motion conjointly translates the shaft 80 and hence the agitating member 100 up and down within the liquid solution to be mixed. As the helical fins 84a, 84b pass through the key slots 43b in the lid opening 43, the shaft 80 is caused to rotate, thereby rotating the agitating member 100 in the liquid solution. The combined translation and rotation of the agitating member 100 acts to thoroughly mix the liquid solution in the container 12. The grip 60 via its connection to the shaft 80 does not rotate.

During the upward stroke, the stop 120 contacts the underside of the lid 14 (and more particularly the connecting member) to prevent any further upward motion of the grip 60. This maintains the agitating member 100 below the surface of the liquid (i.e., the water line WL) during mixing to inhibit air from being entrapped in the formula (FIG. 4).

After mixing is completed, the lid 14 can be rotated from its closed position to its opened position wherein the cutout 54 in the lid is aligned with the spout 32 so that the formula can be poured into, for example, a baby bottle (not shown). Any formula remaining in the container 12 can be stored therein by rotating the lid 14 back to its closed position. The grip 60 may be placed in a stowed position on the lid by inserting the frustum extensions 74a, 74b of the grip into the two frustum portions 42b of the recess 42 formed in the lid 14. In the stowed position, the grip 60 can be used to rotate the lid 14 with respect to the container 12 to the various positions of the lid (e.g., open, closed, locked, unlocked). The remaining formula can be remixed at any time by moving the grip 60 from its stowed position (FIGS. 1, 2, and 39) to its operative position (FIGS. 3 and 4) and moving it up and down as described above.

After each use, the pitcher 10 can be disassembled and washed such as by running the components of the pitcher through a dishwasher. The force necessary to disconnect the agitating member 100 from the shaft 80 is suitably substantially greater then the force necessary to connect the agitating member with the shaft as a result of the differences in slope between the upper and lower tapered surfaces 98a, 98b of the ridges 96 of the fingers 94a, 94b. This prevents the agitating member 100 from disconnecting from the shaft 80 during vigorous mixing by the user. The components of the illustrated pitcher 10 are formed from suitable plastic but it is understood that other suitable materials may be used.

Figure 52:
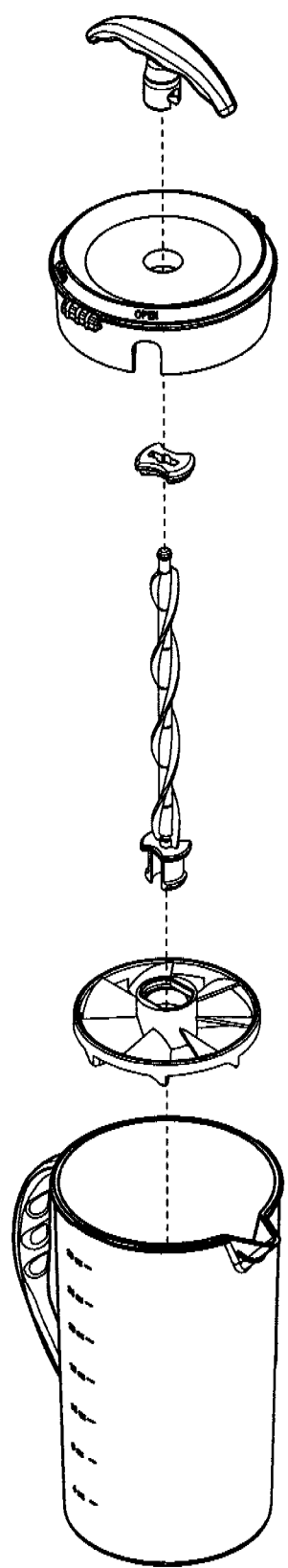
FIG. 52 is an exploded perspective view thereof.
Figure 53:
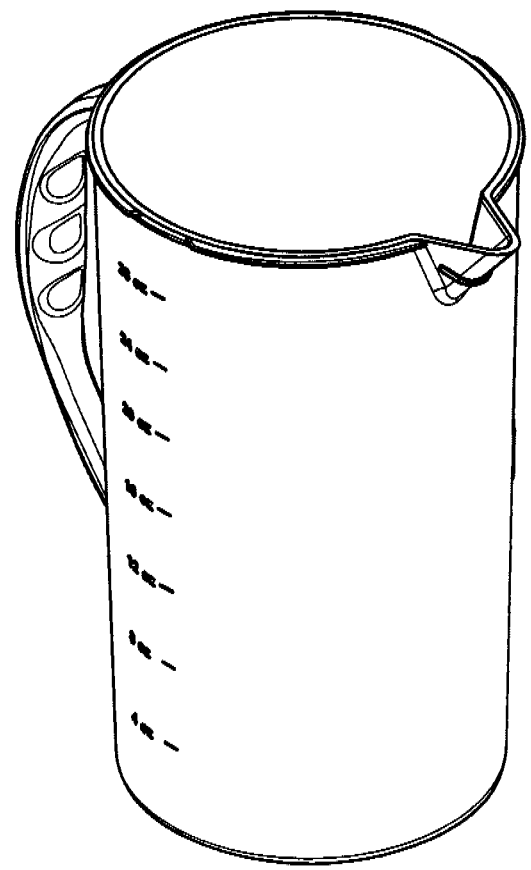
FIG. 53 is a perspective view of a container of the pitcher of FIG. 51.
Figure 54:
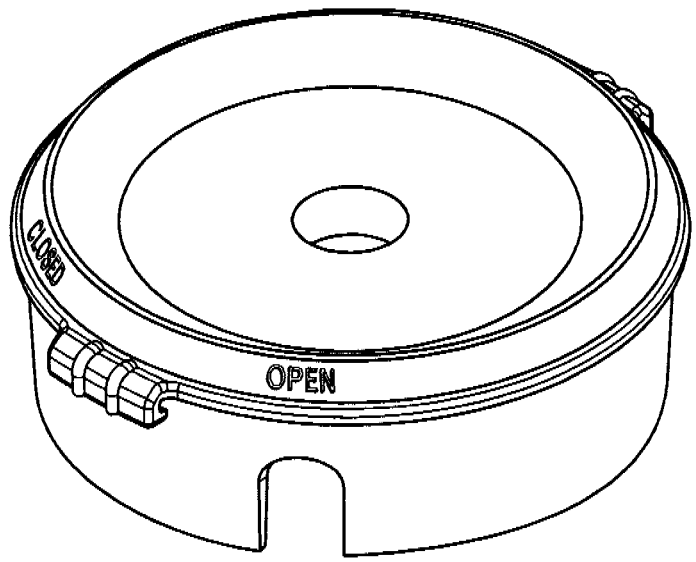
FIG. 54 is a perspective view of a lid of the pitcher.

FIGS. 51-57 illustrate a pitcher 200 of a third embodiment that is similar to the pitchers 10, 10' of the first and second embodiments. As in the previous embodiments, a lid 214 of the third embodiment has a pair of tabs 256 extending radially therefrom and being generally C-shaped in cross-section to define a channel 258 sized for receiving rails 234a, 234b disposed on the container 212 to lock the lid on the container (FIG. 54).

Figure 51:
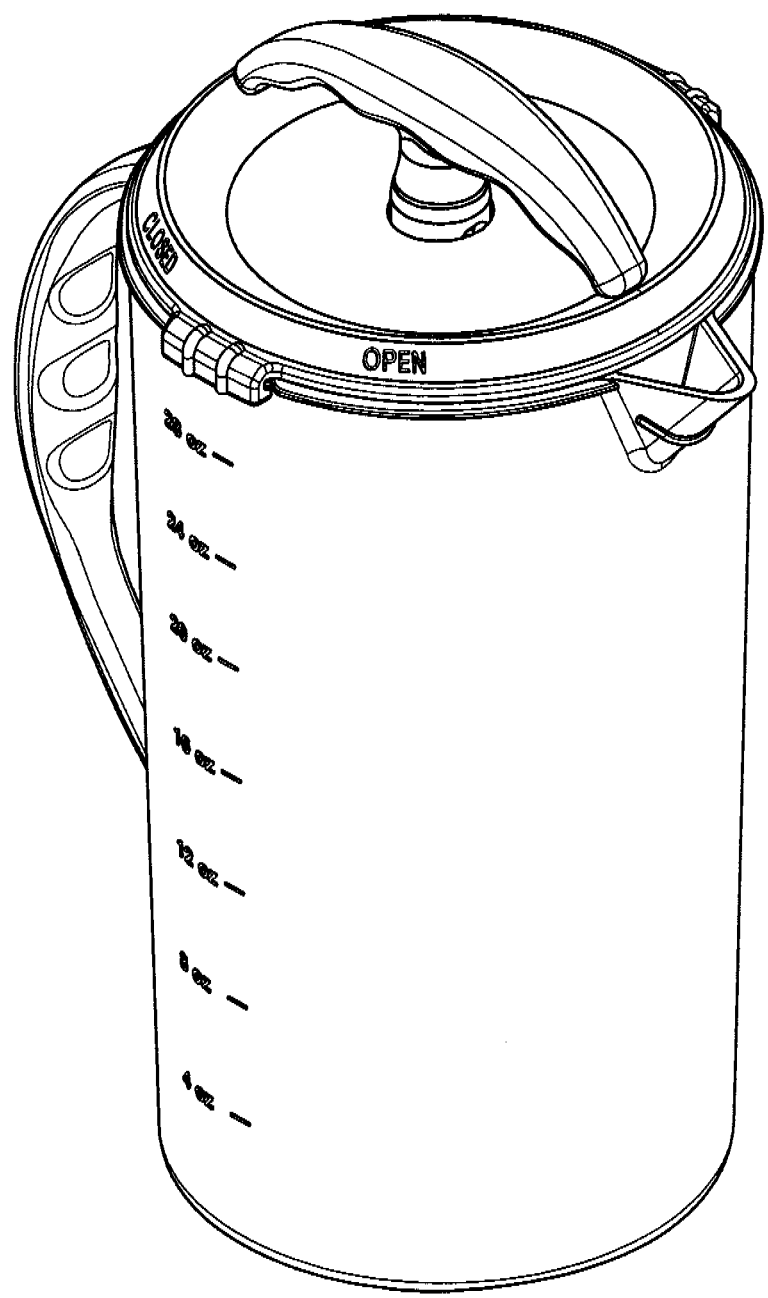
FIG. 51 is a perspective view of a pitcher of a third embodiment.

The container being illustrated in FIGS. 51-53. Each of the tabs 256 of the lid 214 of the third embodiment of the pitcher 200 include ridges 256a formed thereon to provide finger grips to facilitate manual rotation of the lid 214 between various positions of the lid (e.g., open, closed, locked, unlocked). It is understood that the finger grips could be formed differently (e.g., bumps or grooves).

Figure 12:
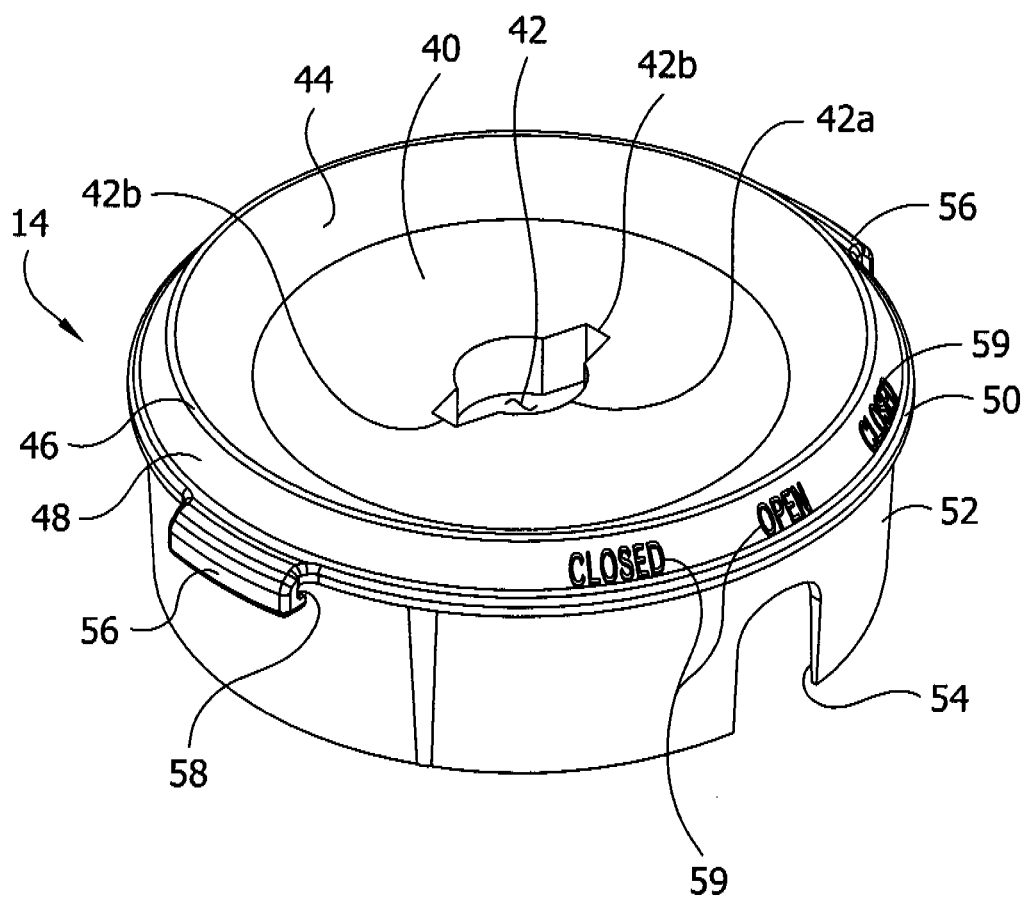
FIG. 12 is a perspective view of the lid.
Figure 13:
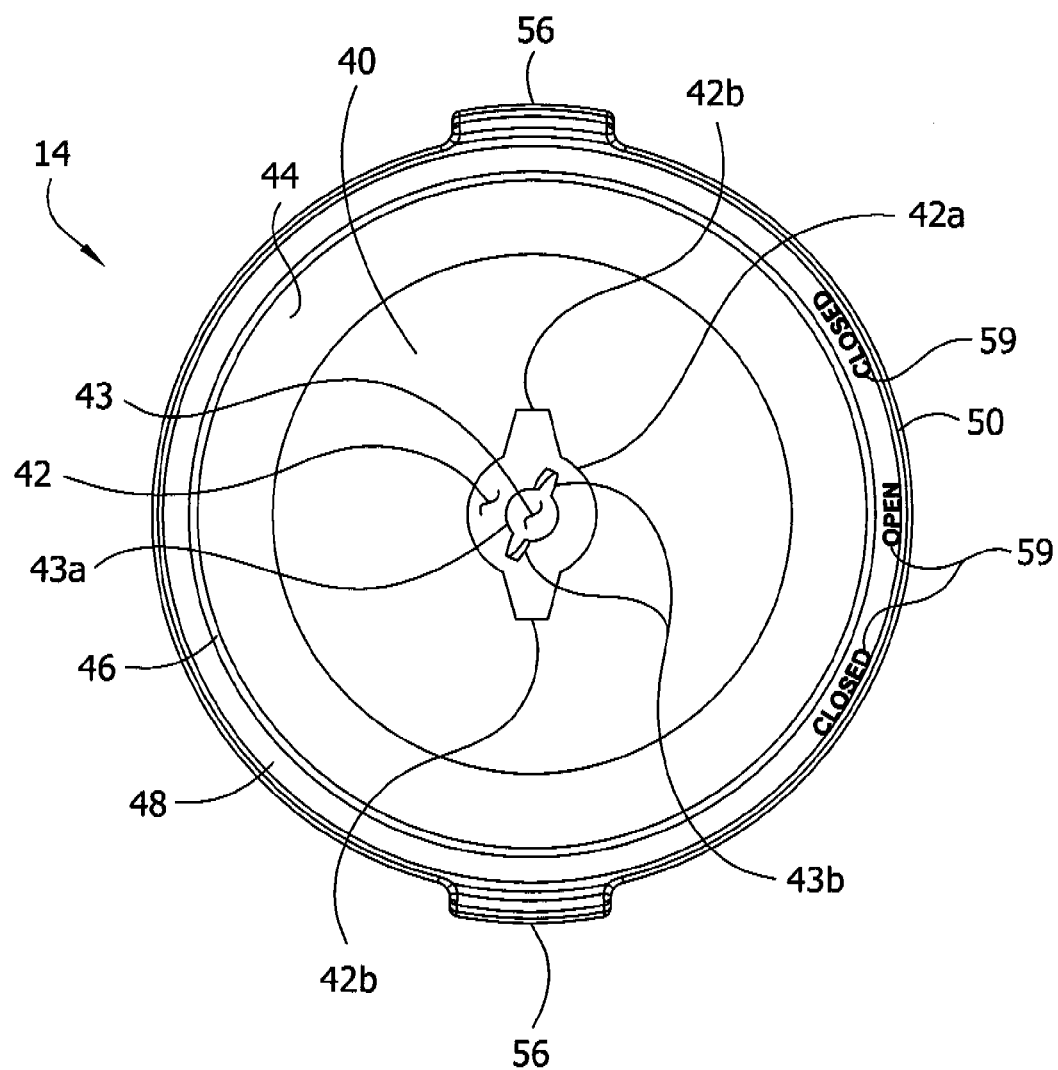
FIG. 13 is a top plan view thereof.
Figure 14:
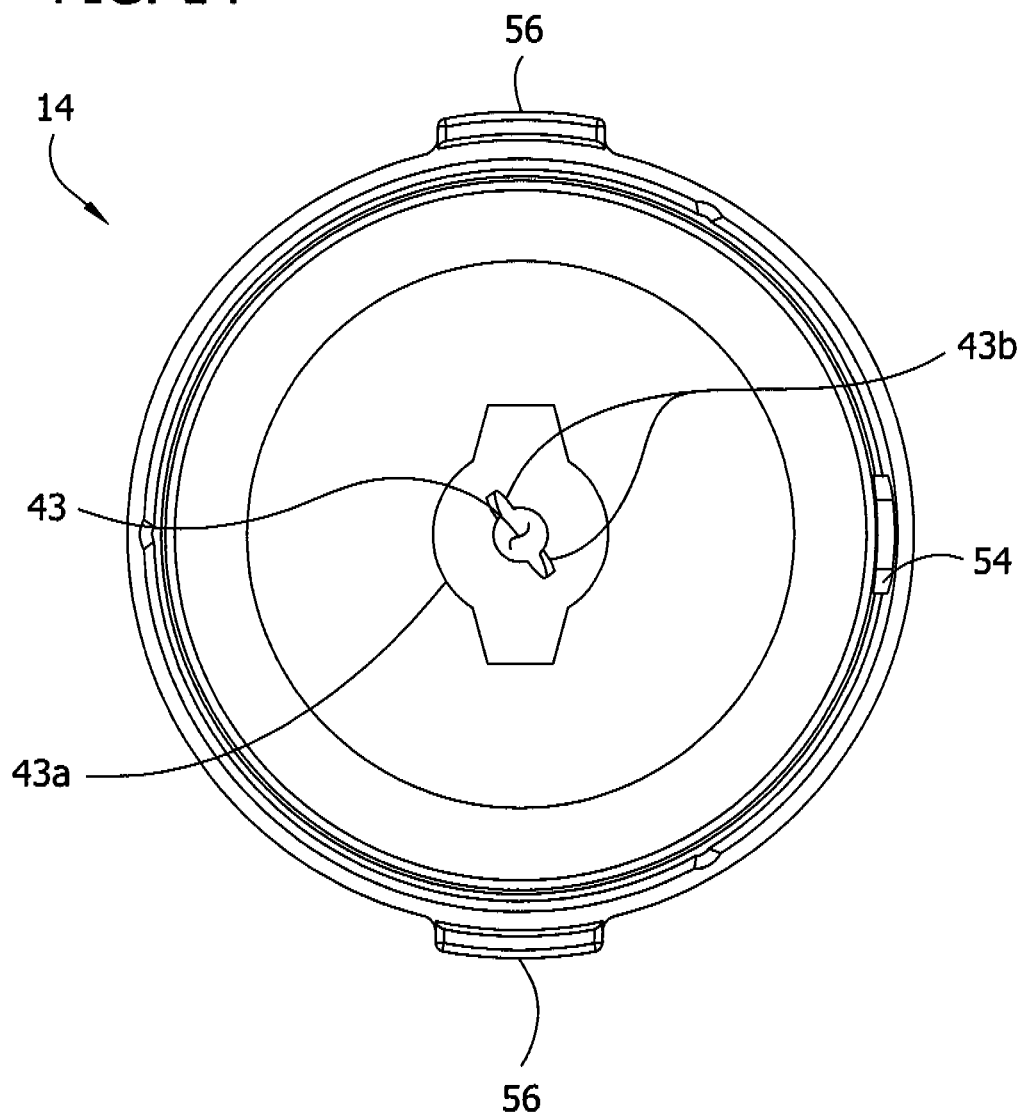
FIG. 14 is a bottom plan view thereof.
Figure 15:
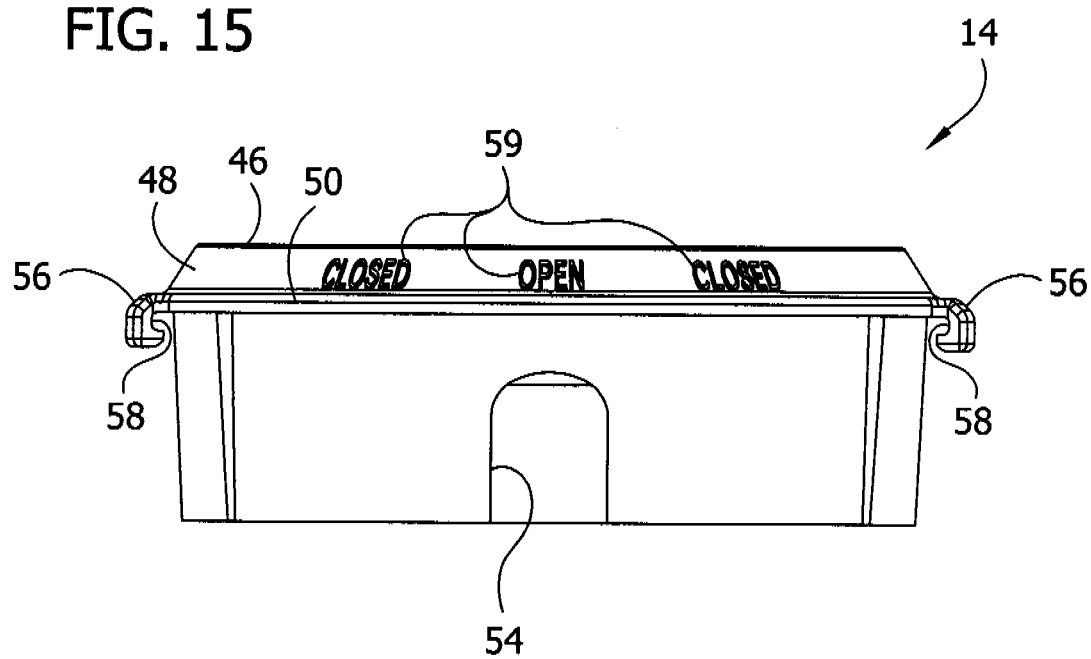
FIG. 15 is a front elevation thereof.
Figure 16:
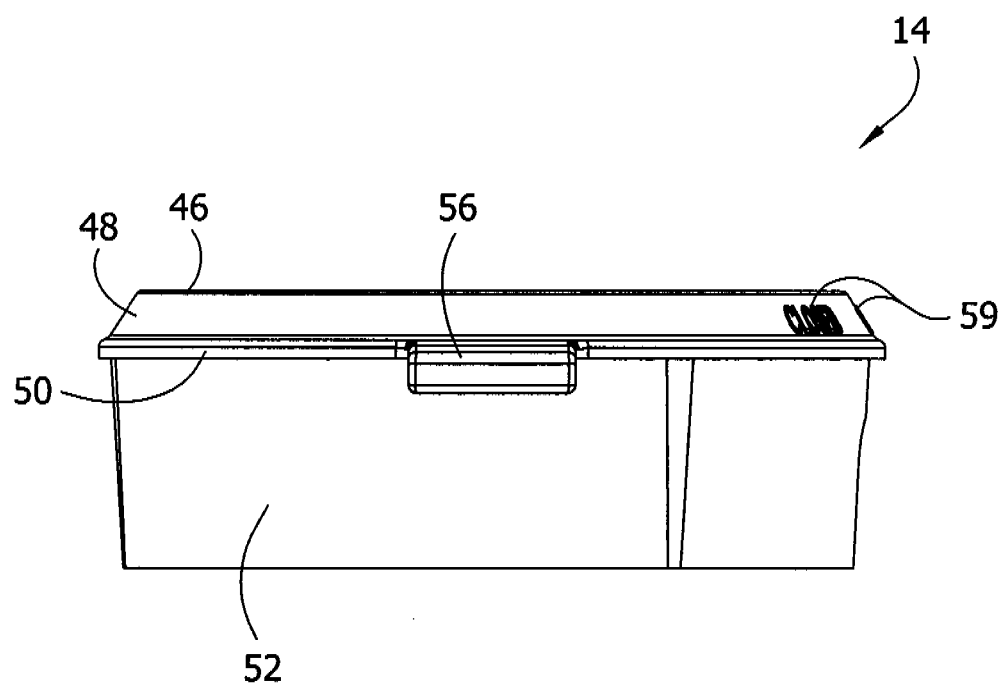
FIG. 16 is a right side elevation thereof.
Figure 17:
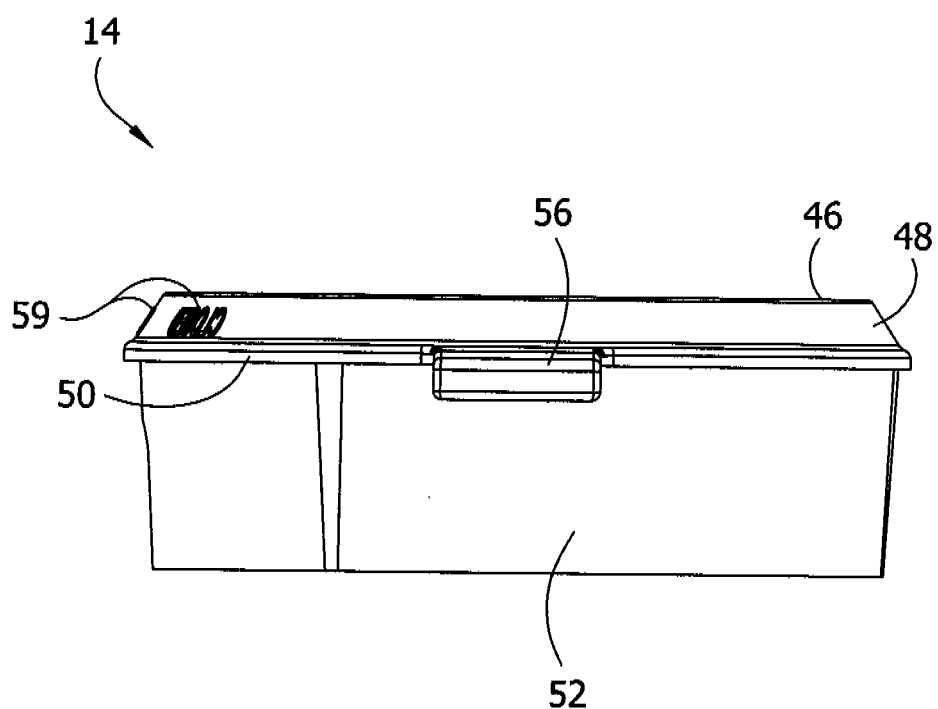
FIG. 17 is a left side elevation thereof.
Figure 18:
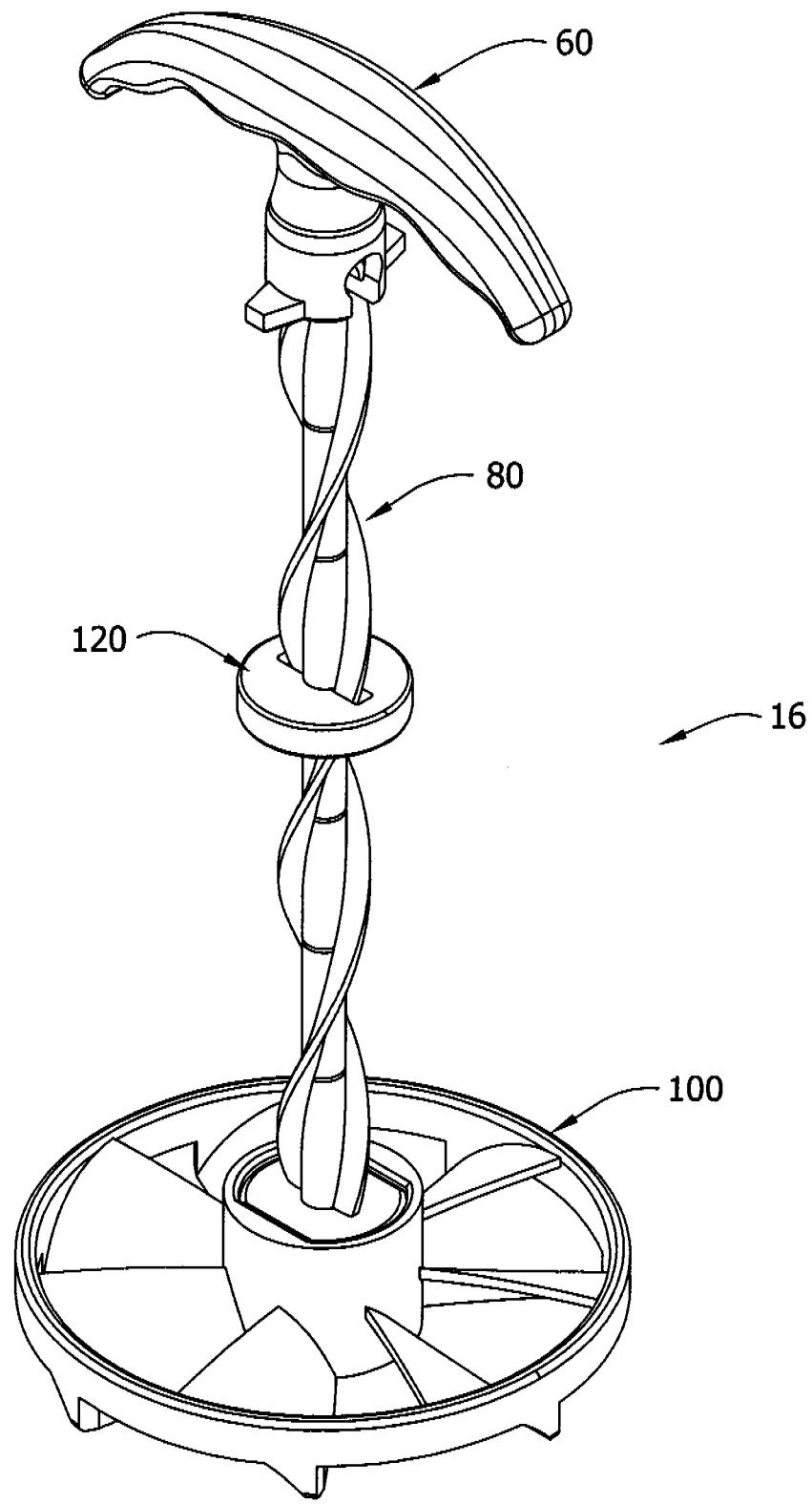
FIG. 18 is a perspective view of the mixing device.
Figure 19:
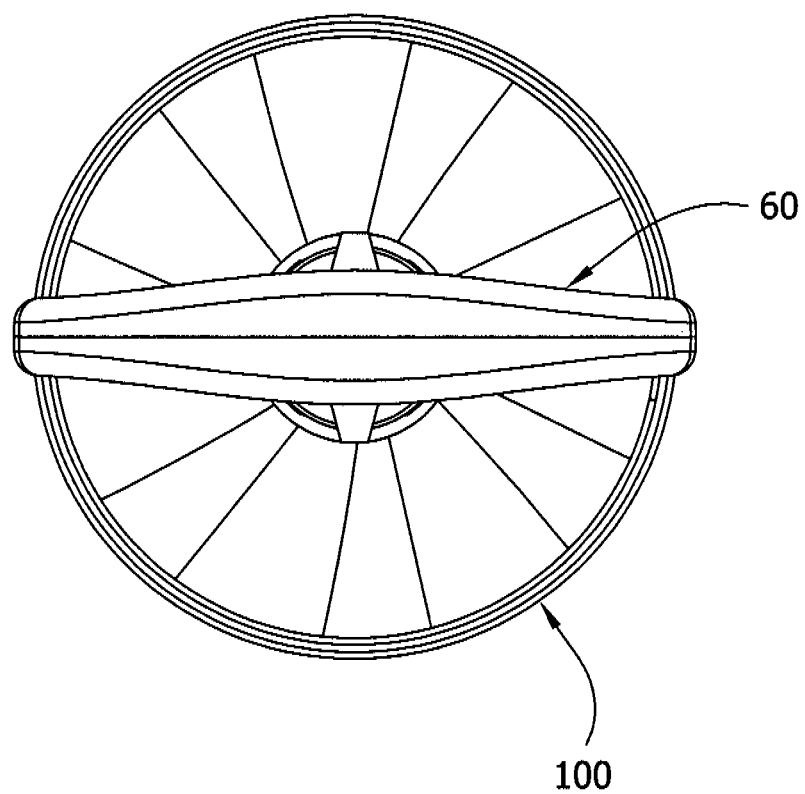
FIG. 19 is a top plan view thereof.
Figure 20:
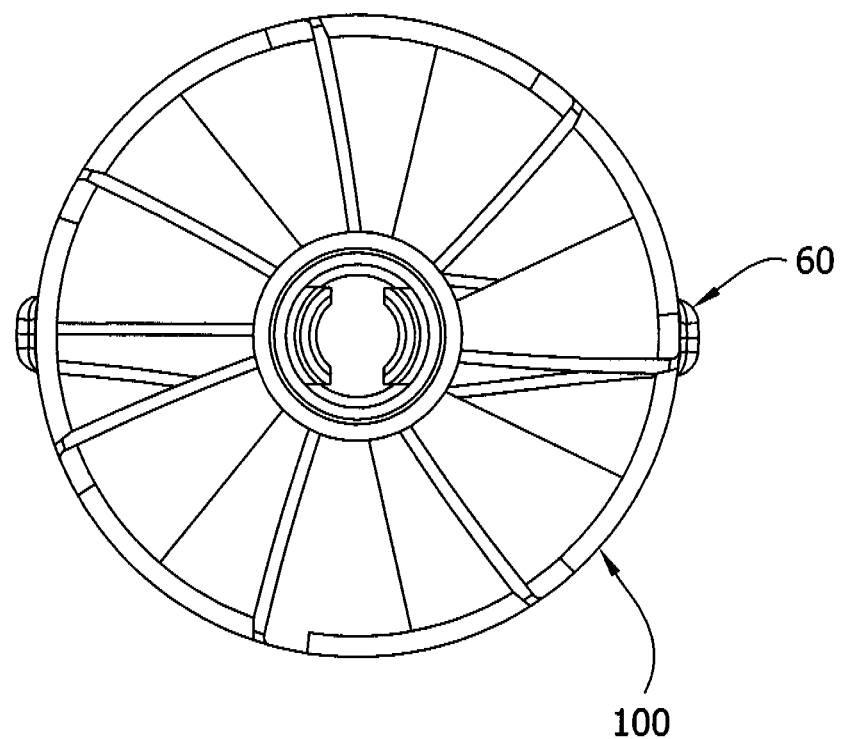
FIG. 20 is a bottom plan view thereof.
Figure 21:
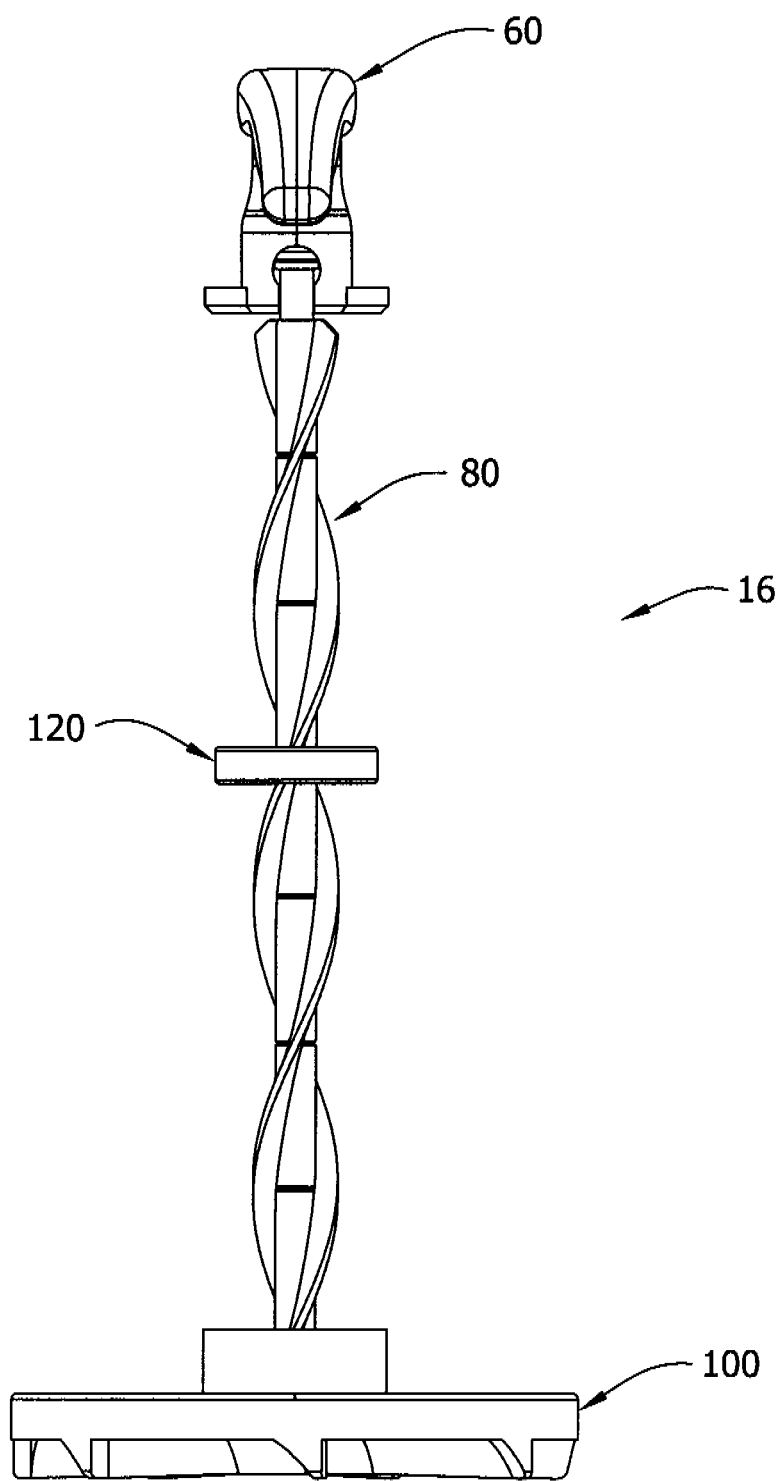
FIG. 21 is a front elevation thereof.
Figure 22:
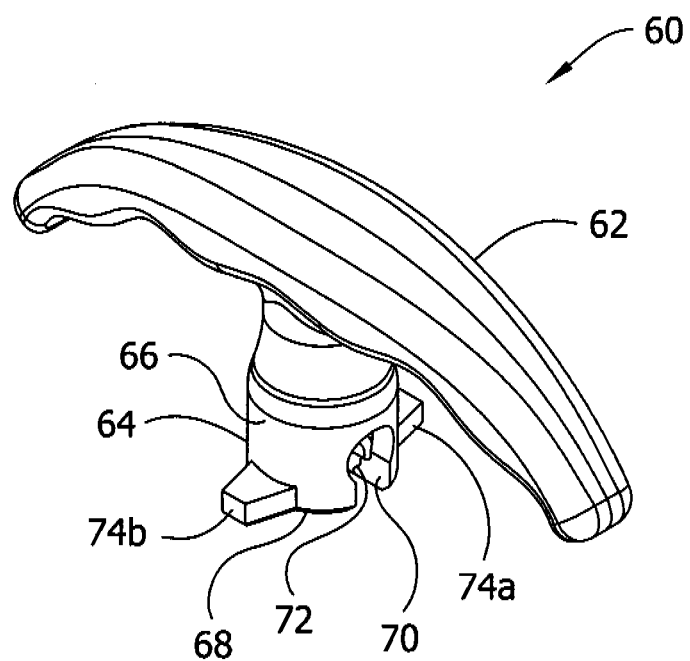
FIG. 22 is a perspective view of the handle.
Figure 23:
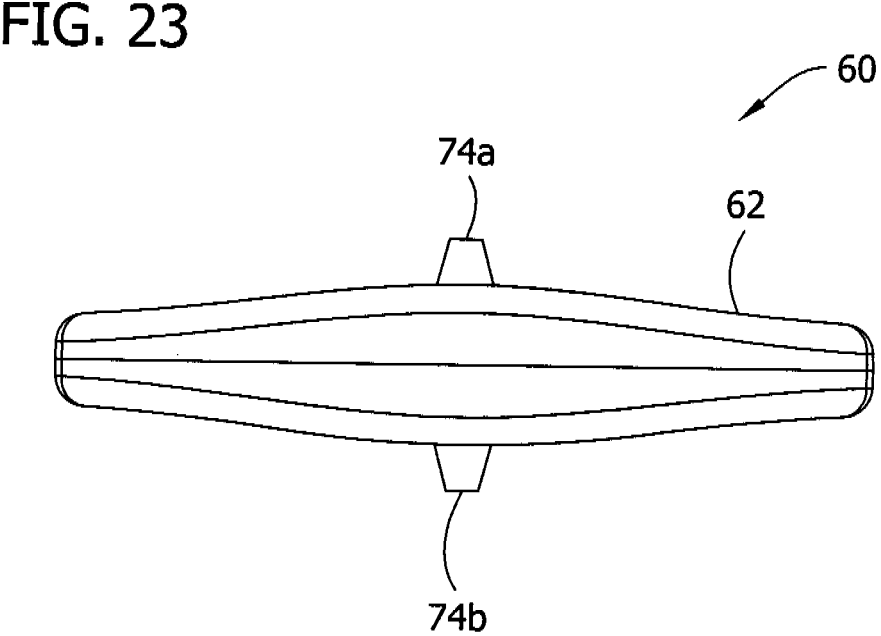
FIG. 23 is a top plan view thereof.
Figure 24:
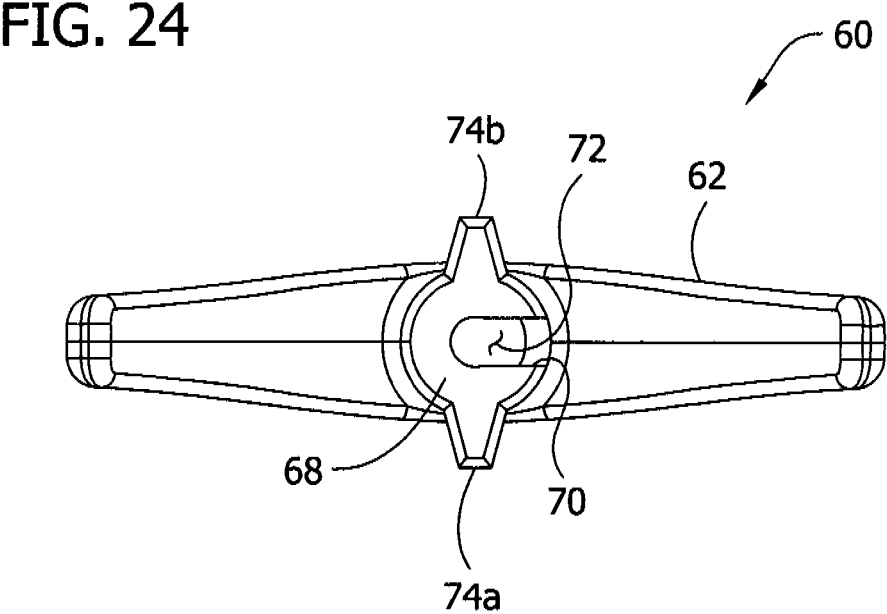
FIG. 24 is a bottom plan view thereof.

In this embodiment of the pitcher 200, a circular recess 242 is formed centrally in a top portion 240 of the lid 214 but it does not include frustum portions such as the two, opposed frustum portions 42b seen in FIG. 12. Moreover, two generally U-shaped cutouts 254 are formed in a sidewall 252 of the lid 214 instead of just one. As a result, the lid 214 can be rotated 180 degrees and still be used to pour liquid from the container 212 through one of the two cutouts 254. In other words, the lid 214 has two open (i.e., pouring) positions instead of one as illustrated in the prior embodiments. Suitable indicia 259 is located on the lid 214 to identify the various positions of the lid with respect to the container 212, e.g., a spout 232 of the container. In the illustrated embodiment, the word "open" is located above both of the cutouts 154 while the word "closed/mix" is disposed on both sides of the word "open" and spaced from the cutouts.

A mixing device 216 of this embodiment comprises a grip 260, a shaft 280, a stop 320 located on the shaft, and an agitating member 300 operatively connected to the shaft. The grip 260 is generally T-shaped having a gripping portion 262 adapted to be gripped by the user during mixing of the liquids within the container 212 and a connecting portion 264 adapted to connect the grip to the shaft 280. The grip 260 is similar to the grip 60 illustrated in FIGS. 22-25 except the grip of the third embodiment of the pitcher 200 does not include two frustum extensions (e.g., frustum extensions 74a, 74b of FIG. 25). As a result, the grip 260 is configured for being partially received in the circular recess 242 formed in the top portion 240 of the lid 214.

The shaft 280 is elongate, having a first end releasably connectable to the grip 260 and a second end opposite the first end and releasably connectable to the agitating member 300. The shaft 280 is substantially similar to the shaft 80 illustrated in FIGS. 26-29 except that a generally elliptical flange 292 disposed near the second end of the shaft 280 includes two cutouts formed in the flange. The agitating member 300 of the mixing device 216 of FIG. 55 is substantially the same as the agitating member 100 of FIGS. 30-34 and therefore attaches to the shaft 280 in the same manner as previously described and illustrated. As a result of the cutouts formed in the flange 292, however, a passageway is formed through the connection of the shaft 280 and the agitating member 300.

The passageway allows liquid and any particulate therein to flow therethrough during the mixing process to increase the mixing capabilities of the mixing device 216 and to reduce the buildup of particulates beneath the flange.

With reference to FIG. 52, the stop 320 of the mixing device 216 has a central opening 322 formed therein that is sized to accommodate the shaft 280. The stop 120 of this embodiment includes cutouts on opposite sides of the stop that generally correspond to and axially align with the cutouts in the flange 292 when the stop is at its lowest point on the shaft 280. Thus, the stop 120 allows liquid and particulates to flow through the passageway in the connection of the shaft 280 and the agitating member 300 without impedance by the stop.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above products without departing from the scope of the invention, it is intended that all matter contained in the above description and shown in the accompanying drawings shall be interpreted as illustrative and not in a limiting sense.

What is claimed is:

1. A pitcher for mixing a liquid solution, said pitcher comprising a container for containing liquid, a lid releasably securable on the container, and a mixing device disposed at least in part within the container, the mixing device comprising a shaft adapted for translation and rotation relative to the container, an agitating member connected to the shaft for conjoint translation and rotation therewith relative to the container to agitate the liquid in the container, and a stop disposed on the shaft to limit translational movement of the shaft and the agitating member, the stop being spaced from the agitating member and the lid and selectively movable along the shaft.

2. The pitcher as set forth in claim 1 wherein the stop has a central opening adapted to accommodate the shaft therethrough.

3. The pitcher as set forth in claim 2 wherein the stop has an inner wall at the central opening and a rib extending inward of the opening to engage the shaft for maintaining the position of the stop on the shaft.

4. The pitcher as set forth in claim 3 wherein the shaft includes a groove for receiving the rib of the stop to releasably secure the stop along the shaft.

5. The pitcher as set forth in claim 1 wherein the stop is located on the shaft to contact the lid upon translation of the shaft to thereby limit translational movement of the shaft and the agitating member relative to the container.

6. The pitcher as set forth in claim 1 further comprising a grip operatively connected to the shaft for manually translating the shaft relative to the container.

7. The pitcher as set forth in claim 1 wherein the agitating member connects to the shaft such that a passageway is formed between the agitating member and the shaft for allowing liquid to flow through that passageway during translational movement of the shaft.

8. A pitcher for mixing a liquid solution, said pitcher comprising:
a container for containing liquid;
a mixing device disposed at least in part within the container, the mixing device comprising a shaft adapted for translation relative to the container, and an agitating member connected to the shaft for conjoint translation therewith relative to the container to agitate the liquid in the container, the agitating member being further adapted for rotation within the container in response to translating movement of the shaft, the shaft having at least one fin that spirals helically around the shaft;
a lid having a recess, an opening in the recess, and at least one key slot extending radially outward from the opening, the shaft being received through the opening such that the at least one fin of the shaft is received in the at least one key slot, and
a grip operatively attached to the shaft, the grip being selectively moveable between an operative position and a stowed position wherein at least a portion of the grip is received within the recess in the lid, the grip engaging the lid in the stowed position.

9. The pitcher as set forth in claim 8 wherein the shaft is adapted for rotation upon translation of the shaft, the agitating member being operatively connected to the shaft for conjoint rotation therewith.

10. The pitcher as set forth in claim 9 wherein the at least one fin comprises a pair of fins that spiral helically around the shaft.

11. The pitcher as set forth in claim 10 wherein the at least one key slot comprises a pair of key slots extending radially outward from opposite sides of the opening, the shaft being received through the opening such that the pair of fins of the shaft are received in respective key slots.

12. The pitcher as set forth in claim 8 wherein the agitating member includes a hub and a plurality of blades extending outward from the hub.

13. The pitcher as set forth in claim 12 wherein the agitating member further includes an annular support spaced from the hub and interconnecting each of the blades.

14. The pitcher as set forth in claim 12 wherein each of the blades is disposed at an angle with respect to the hub.

15. The pitcher as set forth in claim 14 wherein each of the blades is curved along its length so that the angle of the blade at the location where the blade contacts the hub is substantially different than the angle of the blade at a location remote from the hub.

16. The pitcher as set forth in claim 8 wherein the agitating member connects to the shaft such that a passageway is formed between the agitating member and the shaft for allowing liquid to flow through that passageway during translational movement of the shaft.

17. A pitcher for mixing a liquid solution, said pitcher comprising a container for containing liquid, a lid releasably securable on the container, and a mixing device disposed at least in part within the container, the mixing device comprising a shaft adapted for translation relative to the container, an agitating member connected to the shaft for conjoint translation therewith relative to the container to agitate the liquid in the container, the agitating member including a plurality of spaced apart blades with each of said blades being curved and angled with respect to the shaft, each of said blades having a length and being twisted along the length, and a stop disposed on the shaft, the stop being selectively movable along the shaft between the lid and the agitating member.

18. The pitcher as set forth in claim 17 wherein the agitating member is adapted for rotation within the container in response to translating movement of the shaft.

19. The pitcher as set forth in claim 18 wherein the shaft is adapted for rotation upon translation of the shaft, the agitating member being operatively connected to the shaft for conjoint rotation therewith.

20. The pitcher as set forth in claim 19 wherein the shaft has fins that spiral helically around the shaft.

21. The pitcher as set forth in claim 20 wherein the lid has an opening and a pair of key slots extending radially outward from opposite sides of the opening, the shaft being received through the opening such that the fins of the shaft are received in the respective key slots.

22. The pitcher as set forth in claim 17 wherein the agitating member further includes an annular support interconnecting each of the blades.

23. The pitcher as set forth in claim 17 wherein the agitating member connects to the shaft such that a passageway is formed between the agitating member and the shaft for allowing liquid to flow through that passageway during translational movement of the shaft.

24. The pitcher as set forth in claim 17 wherein the container comprises a spout having a purchase rib.

25. The pitcher as set forth in claim 6 wherein the lid has a recess therein, the grip being selectively moveable between an operative position and a stowed position wherein at least a portion of the grip is received within the recess.

\* \* \* \* \*

UNITED STATES PATENT AND TRADEMARK OFFICE
CERTIFICATE OF CORRECTION

| | | |
|---|---|---|
| PATENT NO. | : 8,534,908 B2 | Page 1 of 1 |
| APPLICATION NO. | : 11/852066 | |
| DATED | : September 17, 2013 | |
| INVENTOR(S) | : Rhodes, II et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1523 days.

Signed and Sealed this
Tenth Day of March, 2015

Michelle K. Lee
*Deputy Director of the United States Patent and Trademark Office*